United States Patent
Schulze

(10) Patent No.: US 10,841,586 B2
(45) Date of Patent: Nov. 17, 2020

(54) PROCESSING PARTIALLY MASKED VIDEO CONTENT

(71) Applicant: LogMeIn, Inc., Boston, MA (US)

(72) Inventor: Steffen Schulze, Dresden (DE)

(73) Assignee: LogMeIn, Inc., Boston, MA (US)

(*) Notice: Subject to any disclaimer, the term of this patent is extended or adjusted under 35 U.S.C. 154(b) by 0 days.

(21) Appl. No.: 16/237,621

(22) Filed: Dec. 31, 2018

(65) Prior Publication Data

US 2019/0141331 A1    May 9, 2019

Related U.S. Application Data

(63) Continuation-in-part of application No. 14/615,674, filed on Feb. 6, 2015, now Pat. No. 10,237,559, which
(Continued)

(51) Int. Cl.
*H04B 1/66* (2006.01)
*H04N 7/12* (2006.01)
(Continued)

(52) U.S. Cl.
CPC ......... *H04N 19/132* (2014.11); *G06F 17/175* (2013.01); *H04N 19/176* (2014.11);
(Continued)

(58) Field of Classification Search
CPC .................................................... H04N 19/132
See application file for complete search history.

(56) References Cited

U.S. PATENT DOCUMENTS

| | | |
|---|---|---|
| 6,487,312 B2 | 11/2002 | Kostrzewski et al. |
| 7,509,362 B2 | 3/2009 | Singhal |
| | (Continued) | |

FOREIGN PATENT DOCUMENTS

| | | |
|---|---|---|
| EP | 0421186 | 10/1992 |
| WO | 2017015397 A1 | 1/2017 |

OTHER PUBLICATIONS

Salah Ameer et al., "A Simple Three-Parameter Surface Fitting Scheme for Image Compression"; Proceedings of the First International Conference on Computer Vision Theory and Applications; 2006; pp. 101-106.

(Continued)

*Primary Examiner* — Fabio S Lima
(74) *Attorney, Agent, or Firm* — BainwoodHuang

(57) ABSTRACT

A technique for processing video includes receiving a pixel array, such as a block or layer of video content, as well as a mask that distinguishes masked, "don't-care" pixels in the pixel array from unmasked, "care" pixels. The technique encodes the pixel array by taking into consideration the care pixels only, without regard for the don't-care pixels. An encoder operating in this manner can produce a simplified encoding of the pixel array, which represents the care pixels to any desired level of precision, without regard for errors in the don't-care pixels, which are irrelevant to reconstruction. Further embodiments apply a polynomial transform in place of a frequency transform for encoding partially-masked video content, and/or video content meeting other suitable criteria.

20 Claims, 15 Drawing Sheets

Related U.S. Application Data is a continuation-in-part of application No. 14/548,642, filed on Nov. 20, 2014, now Pat. No. 9,813,721.

(60) Provisional application No. 62/612,515, filed on Dec. 31, 2017.

(51) Int. Cl.

| | |
|---|---|
| *H04N 11/02* | (2006.01) |
| *H04N 19/132* | (2014.01) |
| *H04N 19/176* | (2014.01) |
| *G06F 17/17* | (2006.01) |
| *H04N 19/182* | (2014.01) |
| *H04N 19/61* | (2014.01) |
| *H04N 19/196* | (2014.01) |
| *H04N 19/625* | (2014.01) |

(52) U.S. Cl.
CPC ......... *H04N 19/182* (2014.11); *H04N 19/196* (2014.11); *H04N 19/61* (2014.11); *H04N 19/625* (2014.11)

(56) References Cited

U.S. PATENT DOCUMENTS

| | | | |
|---|---|---|---|
| 8,218,885 B2 | 7/2012 | Ishikawa | |
| 8,295,625 B2 | 10/2012 | Gao et al. | |
| 8,767,817 B1 | 7/2014 | Xu et al. | |
| 2002/0176624 A1 | 11/2002 | Kostrzewski et al. | |
| 2003/0202700 A1* | 10/2003 | Malvar | G06T 5/005 382/195 |
| 2004/0093364 A1 | 5/2004 | Cheng et al. | |
| 2009/0268810 A1 | 10/2009 | Dai | |
| 2013/0114675 A1* | 5/2013 | Guo | H04N 19/13 375/240.02 |
| 2017/0076438 A1* | 3/2017 | Kottenstette | G06K 9/00637 |

OTHER PUBLICATIONS

Redouane El Moubtahij et al.; "Spatial image polynomial decomposition with application to video classification"; Journal of Electronic Imaging, SPIE and IST, 2015, Special Section on Quality Control by Artificial Vision: Nonconventional Imaging Systems, 24 (Issue 6); pp. 1-28.

Jean-Bernard Martens, "Adaptive image processing by means of polynomial transforms", Proceedings vol. 1666, Human Vision, Visual Processing and Digital Display III(/conference-proceedings-of-spie/1666.toc)(1992), 3 pages.

Salah Ameer, "Investigating Polynomial Fitting Schemes for Image Compression", A thesis presented to the University of Waterloo in fulfillment of the thesis requirement for the degree of Doctor of Philosophy in Electrical and Computer Engineering, Waterloo, Ontario, Canada, 2009, 131 pages.

Amar Majeed Butt et al., "On Image Compression Using Curve Fitting", Master Thesis Computer Science Thesis No. MCS-2010-35, Dec. 2010, 52 pages.

Murray Eden et al., "Polynomial Representation of Pictures", Signal Processing 10 (1986), pp. 385-393, North Holland.

I. Sadeh et al., "Polynomial Approximation of Images", Computers Math. Applic. vol. 32, No. 5, pp. 99-115, 1996.

Hayden Schaeffer et al, "Real-Time Adaptive Video Compression", 2015, 22 Pages.

Kousha Etessami et al., "On the Complexity of Nash Equilibria and Other Fixed Points (Extended Abstract)", published in: 48th Annual IEEE Symposium on Foundations of Computer Science, date of conference: Oct. 21-23, 2007, 11 pages.

Kou-Hu Tzou, "Progressive Image Transmission: A Review and Comparison of Techniques", Optical Engineering, 26(7) (journals/optical-engineering/volume-26/Issue-7), 267581 (1987), 3 pages.

\* cited by examiner

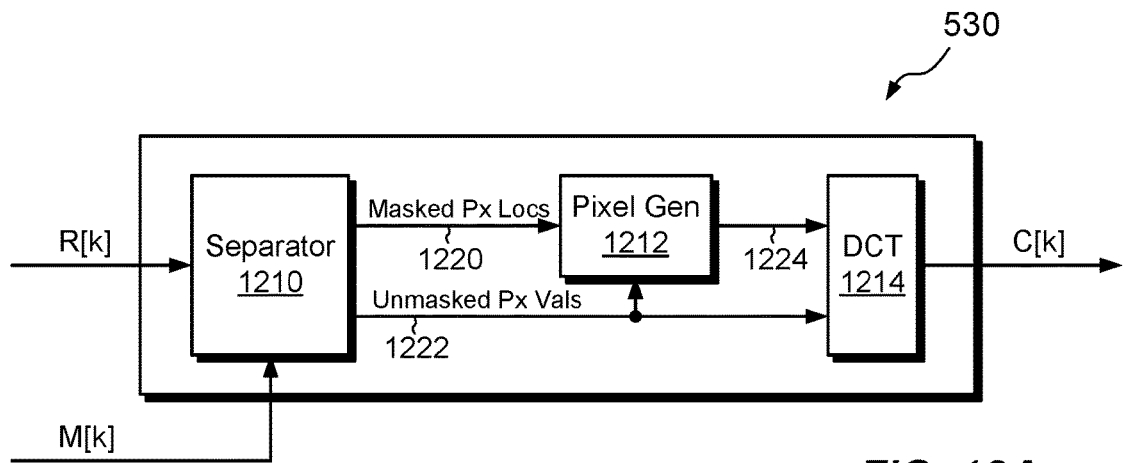
FIG. 12A
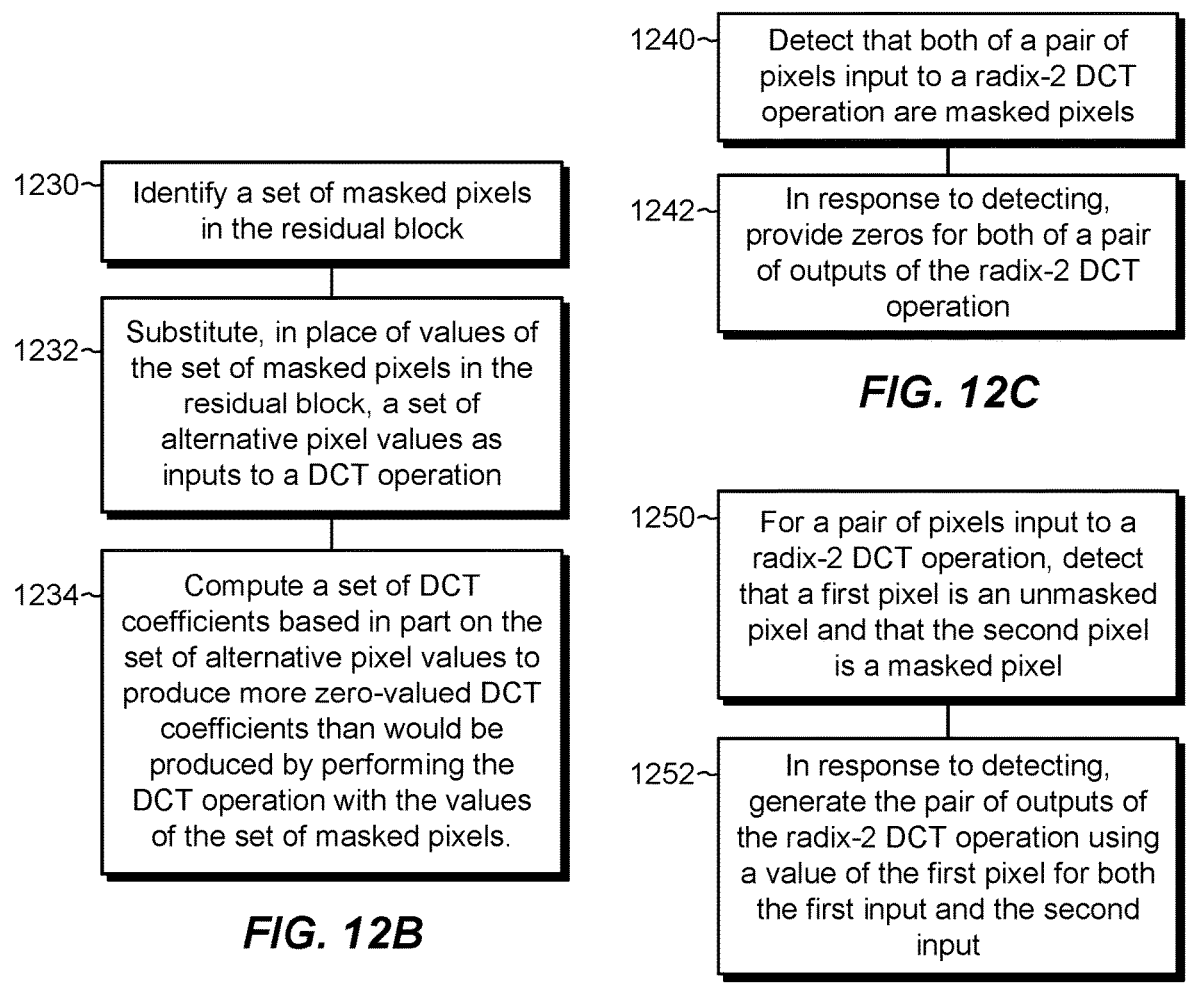
FIG. 12B
FIG. 12C
FIG. 12D

PROCESSING PARTIALLY MASKED VIDEO CONTENT

CROSS-REFERENCE TO RELATED APPLICATIONS

This application is a continuation-in-part of U.S. patent application Ser. No. 14/615,674, filed Feb. 6, 2015, which itself is a continuation-in-part of U.S. patent application Ser. No. 14/548,642, filed Nov. 20, 2014. This application also claims the benefit of U.S. Provisional Patent Application No. 62/612,515, filed Dec. 31, 2017. The contents and teachings of these three prior applications are incorporated herein by reference in their entirety.

BACKGROUND

A conventional video codec (compressor/decompressor) includes both an encoder and a decoder. The encoder compresses video signals, and the decoder decompresses video signals. Codecs typically perform compression and decompression on "blocks" of video "frames," where each block is a two-dimensional array of pixels, such as 8×8 pixels or 16×16 pixels, for example, and each frame corresponds to a still snapshot of the video signal. Well-known video codecs include those conforming to H.264 or H.265 standards.

Codecs typically achieve efficient compression by taking advantage of predictions. For example, an encoder may employ intra-frame prediction, which applies information from previously-processed blocks in the same frame as a current block to predict pixels in the current block. An encoder may also employ inter-frame prediction, which applies information from previously-processed frames to predict pixels in the current block. For each current block to be encoded, the encoder selects a prediction mode and generates a prediction. The encoder then subtracts the prediction, pixel-by-pixel, from the current block to generate a residual block. If the current prediction closely matches the current block, then the residual block generally requires less data to encode than would be required for the current block without prediction. The encoder may next perform a lossless, 2-dimensional Discrete Cosine Transform, or "DCT," on the residual block. The DCT transforms pixel data in the spatial domain into coefficients in the frequency domain. The encoder subjects the DCT coefficients to a lossy quantization process, whereby DCT coefficients are scaled and rounded and/or truncated, to reduce their granularity and to increase the number of coefficients that equal zero. Zero-valued coefficients are highly compressible and are thus preferred when high compression ratios are desired. The encoder typically performs lossless entropy encoding on the quantized DCT coefficients and stores the results and/or transmits them to a decoder, e.g., at another location, along with an identifier of the prediction mode that the encoder used in compressing the current block.

The decoder performs essentially the reverse process. For example, the decoder, upon receiving a compressed block, reverses the entropy encoding, descales the entropy-decoded results, and performs an inverse-DCT operation (IDCT) to reconstruct the residual block. The decoder also reads the prediction mode received from the encoder and replicates the same prediction locally, i.e., using previously decoded blocks. The decoder then adds the replicated prediction to the residual block to reconstruct the original block, albeit with losses introduced by encoder quantization. The decoder assembles the reconstructed original block along with other reconstructed blocks to generate frames of video data for viewing on a user device, such as a computer, television, smart phone, tablet, or the like.

SUMMARY

Residual blocks produced by conventional codecs can include detailed content, which codecs cannot always predict with accuracy. For example, consider the case where a video signal contains small text that cannot be predicted, such that the encoder produces residual blocks that include entire text characters or portions of characters. When the encoder performs DCT operations on such residual blocks, the resulting frequency content can be high, reflecting detailed shapes and high-contrast edges of the characters. In situations such as these, the conventional encoder is faced with a choice. If the encoder quantizes the DCT coefficients aggressively, so as to reduce the size and/or number of non-zero DCT coefficients, legibility of reconstructed text may suffer. However, if the encoder quantizes the DCT coefficients less aggressively, compression ratios may suffer, meaning that more data will be needed to ensure legible reconstruction. Thus, conventional codecs involve a tradeoff between legibility and compression ratio.

One prior codec technology, which has been used in web conferencing applications, addresses this tradeoff using a hybrid approach. According to this approach, an encoder identifies synthetic content, such as text, in video images, and compresses the synthetic content using a lossless format, such as PNG (Portable Network Graphics). The encoder distinguishes synthetic content from natural content by counting colors, i.e., by identifying regions with little or no color variation as synthetic. The encoder compresses natural image content using lossy compression, such as JPEG (Joint Photographic Experts Group). A video codec using the hybrid approach thus produces two different compressed data streams, one that is lossless (PNG) and another that is lossy (JPEG). A decoder receives these two data streams and combines them using alpha blending.

Although the hybrid approach can help to preserve synthetic content, such as text, by using lossless compression, the use of lossless compression is limited to synthetic content, such that fine detail in natural parts of an image are not always preserved. Also, the hybrid approach can produce compression artifacts at boundaries between synthetic and natural content. For example, if synthetic text is displayed over a natural background, noisy pixels may appear in the natural background around the text, obscuring the text even though the text itself has been losslessly compressed. Further, because the hybrid approach compresses synthetic content using lossless compression, compression ratios are not as good as they might be if lossy compression had been used.

In contrast with the above-described prior approaches, a disclosed technique processes video signals using both a layer-based encoder and a layer-based decoder. The encoder lossily compresses a portion of a video signal by generating video data including multiple lossily-compressed residual layers, prediction information for each of the residual layers, and a set of masks. The decoder receives the video data and applies the prediction information to decompress the layers. The decoder then applies the set of masks to the decompressed layers to reconstruct the portion of the video signal.

Advantageously, video signals expressed as layers are often more amenable to compression than are video signals without layers. Thus, layers generated by the encoder and processed by the decoder are often more aggressively compressed than are video signals generated and processed by conventional codecs. In addition, image quality is often improved, as edge artifacts can be reduced or eliminated through the use of masks.

In addition, we have recognized that using conventional schemes for processing partially-masked layers having both masked pixels and unmasked pixels can be burdensome. Masked pixels contribute no meaningful content to an encoded layer, yet conventional schemes treat masked pixels no differently than unmasked pixels. What is needed is a simplified approach for processing partially-masked layers, which is less computationally burdensome than prior schemes and produces smaller encoded data sets.

To these ends, an improved technique receives a two-dimensional pixel array, such as a block or layer of video content, as well as a mask that distinguishes masked, "don't-care" pixels in the pixel array from unmasked, "care" pixels. The technique encodes the pixel array by taking into consideration the care pixels only, without regard for the don't-care pixels. The resulting encoding of the pixel array predicts values at locations of the don't-care pixels, but those values are allowed to assume any levels that simplify the encoding of the care pixels. An encoder operating in this manner can produce a simplified encoding of the pixel array, which represents the care pixels to any desired level of precision, without regard for errors in the don't-care pixels, which are irrelevant to reconstruction.

Further still, we have recognized that the DCT and other frequency transforms often require large amounts of data to represent video or other image signals. Certain image features that can be described very simply in the spatial domain require large amounts of data to represent accurately in the frequency domain. Consider, for example, continuously changing gradients of color and/or brightness. These features require a large number of frequency components to represent precisely but can be described very simply and accurately in spatial terms.

Given this deficiency in conventional frequency transforms, additional improved techniques selectively apply a polynomial transform (PTM) in place of a DCT or other frequency transform (FTM), for encoding video block contents that meet a specified set of criteria. Contents meeting the criteria are encoded using the PTM, and contents not meeting the criteria are encoded using an FTM. The PTM operates in the spatial domain by generating a polynomial surface that represents pixels of video content, such as a block or layer. An encoder renders the polynomial surface as a set of parameters and supplies the parameters in a video stream to a decoder, which reconstructs the video content based on the parameters. Various criteria may be used for applying the PTM, such as image complexity, the presence of text or other high-contrast content over a background, and/or based on whether the content is natural or synthetic. Layer-based video processing may be used with some embodiments, but it is not required for all embodiments. As the PTM operates more efficiently on selected content than would a DCT or other frequency transform, selective use of the PTM improves computational efficiency of encoders. It also produces smaller data sets, which translates to lower bandwidth requirements.

Certain embodiments are directed to a method of encoding video signals, the method includes receiving, by electronic encoding circuitry, a pixel array and a mask. The pixel array includes a two-dimensional array of pixels that represents a portion of a video signal. The mask distinguishes care pixels of the pixel array from don't-care pixels, where the care pixels are pixels of the pixel array that are marked as relevant to reconstruction of the pixel array, and where the don't-care pixels are pixels of the pixel array that are marked as irrelevant to reconstruction of the pixel array. The method further includes generating an encoded version of the pixel array based on values of the care pixels only, such that the values of the don't-care pixels do not contribute to the encoded version of the pixel array, and providing the encoded version of the pixel array to electronic decoding circuitry configured to reconstruct the pixel array from the encoded version of the pixel array.

Other embodiments are directed to a method of encoding video signals. The method includes receiving, by electronic encoding circuitry, multiple pixel arrays, each pixel array providing a two-dimensional array of pixels that represents a respective portion of a video signal. The method further includes testing each of the pixel arrays to determine whether it meets a specified set of criteria. The testing produces a first set of pixel arrays that meets the criteria and a second set of pixel arrays that does not. For each of the first set of pixel arrays, the method includes performing a polynomial transform (PTM) on the pixel array to produce a respective set of polynomial parameters, each set of polynomial parameters describing the respective pixel array as a multi-dimensional, spatial-domain surface. For each of the second set of pixel arrays, the method includes performing a frequency transform (FTM) on the pixel array to produce a respective set of frequency coefficients. The method still further includes providing each set of polynomial parameters produced from the first set of pixel arrays and each set of frequency coefficients produced from the second set of pixel arrays to electronic decoding circuitry configured to reconstruct the video signal.

Further embodiments are directed to an apparatus constructed and arranged to perform a method of encoding video signals, such as one of the methods described above. Still other embodiments are directed to a computer program product. The computer program product stores instructions which, when executed by electronic encoding circuitry, cause the electronic encoding circuitry to perform the method of encoding video signals, such as one of the methods described above. Some embodiments involve activity that is performed at a single location, while other embodiments involve activity that is distributed over a computerized environment (e.g., over a network).

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

FIGS. 12A-12D are a block diagram and associated flowcharts that show various example acts for performing DCT operations based on masks generated for respective layers;

DETAILED DESCRIPTION

Embodiments of the invention will now be described. It is understood that such embodiments are provided by way of example to illustrate various features and principles of the invention, and that the invention hereof is broader than the specific example embodiments disclosed.

This description is presented in the following sections to assist the reader:

Section I presents a technique for layer-based encoding and decoding of video data, as well as an example environment in which embodiments can be practiced; and Section II presents particular improvements for encoding partially-masked video signals and for selectively applying polynomial transforms to video data.

Section I: Layer-Based Encoding and Decoding of Video Data.

An improved technique for decoding video signals includes receiving video data that includes multiple lossily-compressed residual layers, prediction information for each of the residual layers, and a set of masks. The technique applies the prediction information to decompress the layers and applies the set of masks to the decompressed layers to reconstruct a portion of a video signal.

Figure 1:
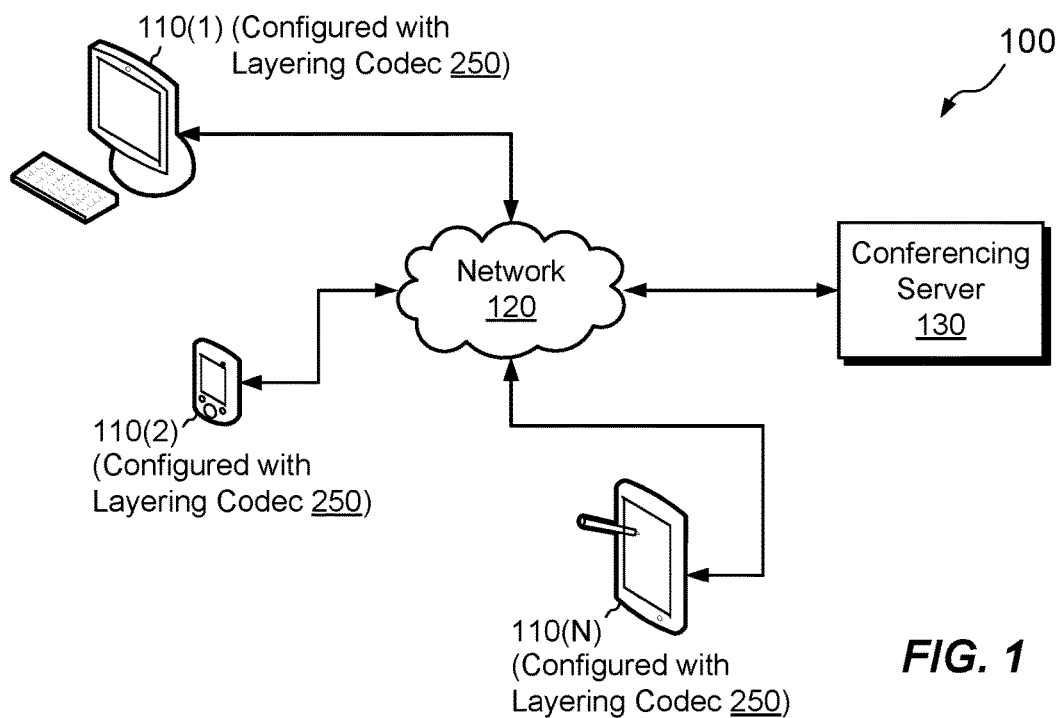
FIG. 1 is a block diagram of an example environment in which embodiments of the improved technique hereof may be practiced.

FIG. 1 shows an example environment 100 in which embodiments of the improved technique hereof can be practiced. Here, multiple client machines, shown as machines 110(1) through 110(N), connect to a network 120. In some examples, a web conferencing server 130 also connects to the network 120. Each of the machines 110(1) through 110(N) is configured with a layering codec 250. The layering codec 250 is capable of encoding video signals by representing blocks in the form of layers and masks. The layering codec 250 is also capable of decoding video signals.

In example operation, the machines 110(1) through 110(N) each have installed thereon a web conferencing application. Users of machines 110(1) through 110(N) may each run the web conferencing application on their respective machines to participate in a web conference, which may be orchestrated by the web conferencing server 130. As the web conference proceeds, users of the machines 110(1) through 110(N) can communicate using audio signals and may share live video of themselves and of their surroundings. By invoking features of the web conferencing application, users may also share their desktops or particular applications or documents, such that all conference participants may view the same screen content at the same time. Screen sharing can serve numerous useful purposes, such as to allow users to make presentations, to work collaboratively, or simply to share information.

Each of the machines 110(1) through 110(N) may employ its respective layering codec 250 to compress and/or decompress video content, including screen content. For example, a codec running on any of the machines 110(1) through 110(N) obtains a video signal from a local camera (e.g., a webcam) and/or from locally originated screen content and encodes the obtained video signal. The originating machine transmits the encoded video signal, e.g., point-to-point or via the conferencing server 130, to receiving machines. Each receiving machine applies its respective codec to decode the video signal for viewing on a respective display.

By employing the layering codec 250, machines 110(1) to 110(N) can compress video data, and screen data in particular, more efficiently in real time than may be possible using conventional codecs. Also, production of noisy pixels around text or other high-contrast features can often be reduced or eliminated.

It should be understood that the machines 110(1) through 110(N) can be provided in any number and in any suitable form or forms, such as using any of desktop computers, laptop computers, smartphones, tablets, PDAs (personal data assistants), televisions, set-top boxes, and so forth, which are capable of operating the layering codec using software instructions executed by a set of processors and/or by using a specialized device or set of devices. Different ones of the machines 110(1) through 110(N) may be provided as different types of machines. In addition, the machines 110(1) through 110(N), or any of them individually, may interface with external or otherwise separate layering codecs. The layering codecs 250 may be implemented, for example, as self-contained devices, as separate modules, as integrated circuits, or as combinations of any of the above. Thus, the layering codec 250 may be implemented using any electronic circuitry, whether computerized or not.

The network 120 may be implemented using any type of network capable of conveying video data, such as a computer network (WAN, LAN, the Internet, etc.), a cable television network, a satellite network, a cell phone network, an over-the-air broadcast network, or any type of network or combination of networks.

Also, although the layering codec 250 is presented in connection with a web conferencing application, it should be understood that the use of the web conferencing application is merely illustrative. Rather, the layering codec 250 may be used in any situation that requires video compression and/or decompression.

Figure 2:
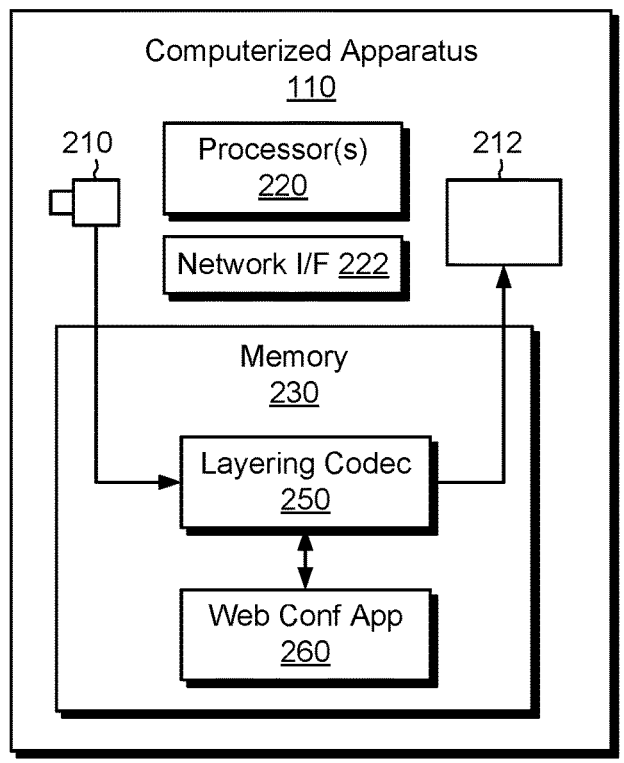
FIG. 2 is a block diagram of an example computerized apparatus of the type shown in FIG. 1.

FIG. 2 shows and example implementation of a computerized apparatus 110, and is intended to be typical of the machines 110(1) to 110(N). As indicated above, however, different ones of the machines 110(1) to 110(N) may be implemented differently. Thus, the example shown in FIG. 2 is merely illustrative.

Here, the computerized apparatus 110 is seen to include a camera 210, such as a built-in webcam or other camera, and a display 212, such as a computer monitor, screen, touchscreen, projector, television, etc. The computerized apparatus 110 is also seen to include a set of processors 220 (i.e., one or more processing chips and/or assemblies), a network interface 222, and memory 230. The memory 230 includes both volatile memory (e.g., RAM) and non-volatile memory, such as one or more disk drives, solid state drives, and the like. The set of processors 220 and the memory 230 together form control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations specified by the software constructs. Although certain software constructs are specifically shown and described, it is understood that the memory 230 typically includes many other software constructs, which are not shown, such as an operating system and various applications, processes, daemons, and so forth.

The memory 230 is seen to include instructions for realizing the above-described layering codec (250) and the web conferencing application (260). As shown, the layering codec 250 receives input from the camera 210, e.g., in a raw video format, and compresses the input for transmission to other machines 110 via the network interface 222. The layering codec 250 also receives compressed video signals via the network interface from other machines 110 and decompresses the received video signals. The computerized apparatus 110 may output the decompressed video signals to the display 212, e.g., for presentation to a user.

In some examples, the web conferencing application 260 operates in coordination with the layering codec 250 to send and receive video signals. The video signals may include live cameral video as well as screen content of any displayed applications, windows, or desktops.

Figure 3:
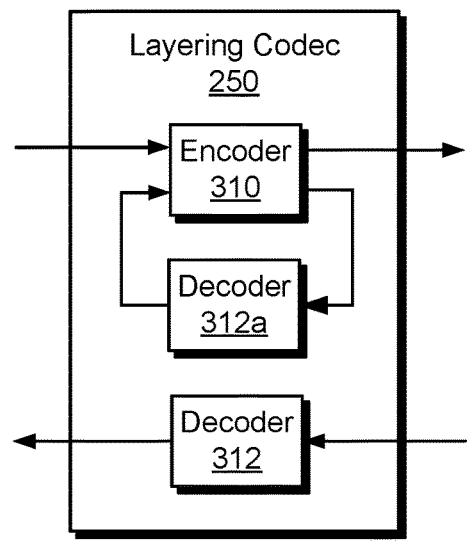
FIG. 3 is a block diagram of an example layering codec, which may be provided in the example computerized apparatus of the type shown in FIGS. 1 and 2.

FIG. 3 shows an example implementation of the layering codec 250 in additional detail. Here, it is seen that the layering codec 250 includes an encoder 310, for compressing video signals, e.g., from the camera 210, from screen content, and/or from other sources, and a decoder 312, for decompressing video signals arriving from other machines or other compressed video sources. The layering codec 250 is also seen to include a decoder 312a. The decoder 312a is similar or identical to the decoder 312. The decoder 312a provides a replica of what a remote decoder would generate when decompressing video compressed by the encoder 310. In some examples, the encoder 310 receives output from the decoder 312a and applies the output to make inter-frame predictions and/or to adjust the manner in which the encoder 310 performs compression based on feedback from the decoder 312a. Just as the layering codec 250 may be implemented using electronic circuitry of any kind, whether computerized or not, so too may the encoder 310 and decoder 312/312a each be implemented separately or together using electronic encoding circuitry and electronic decoding circuitry, respectively, whether computerized or not. Thus, the provision of the encoder 310 and decoders 312 and 312a within the computerized apparatus 110 should be regarded as merely illustrative.

In the example shown, the encoder 310 provides two outputs, a first output that carries entropy-encoded video data, e.g., for transmission over the network 120, and a second output that carries video data without entropy encoding, for provision to the decoder 312a. In such examples, the decoder 312 includes entropy decoding circuitry for decoding entropy-encoded input signals, whereas the decoder 312a does not.

Figure 4:
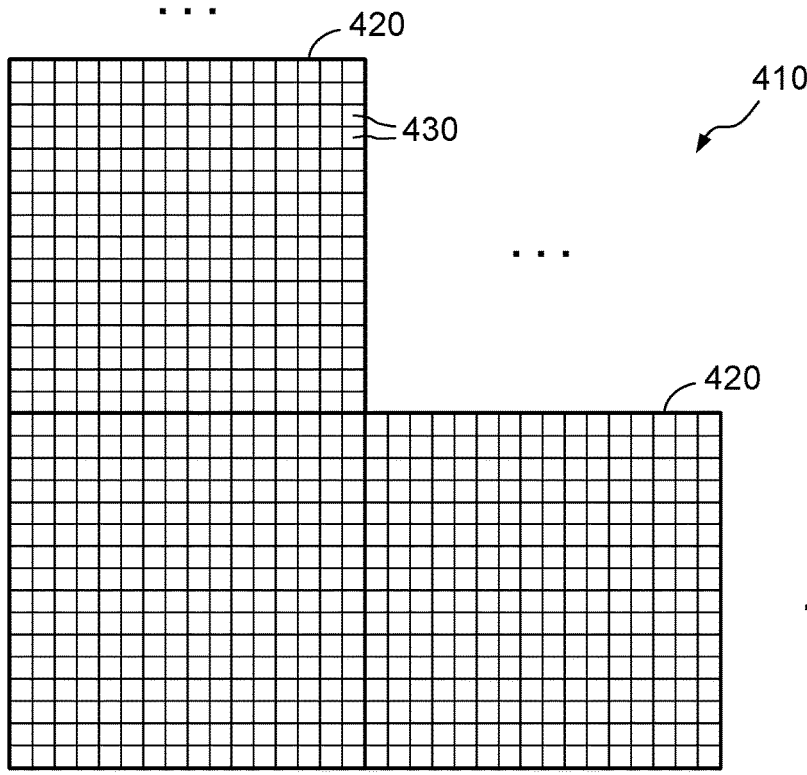
FIG. 4 is an illustration of example blocks and pixels of a portion of a video signal.

FIG. 4 shows an example portion 410 of a video signal, which the encoder 310 may receive as input and/or which either of the decoders 312 or 312a may provide as output. The portion 410 of the video signal is seen to include multiple blocks 420 (three blocks 420 are shown). Each block 420 is a square array of pixels 430. For example, each of the blocks 420 is a 2-dimensional, 16×16 array of pixels 430. This is merely an example, however, as other block sizes may be used, such as 4×4, 8×8, 32×32, and so forth. In an example, the portion 410 of the video signal is part of a frame of video that includes many blocks 420 arranged in a rectangular array.

The pixels 430 themselves may be provided in a variety of formats. For example, the pixels 430 may be provided as binary pixels (e.g., black and white), as grayscale pixels, as monochrome color pixels, as composite color pixels, as pixels having luma and chroma values, as pixels having different color channels, or as pixels of other formats. The encoder 310 may receive such pixels, and the decoders 312 and 312a may output such pixels, in any of these formats, or in other formats, with minor and readily-discernable adjustments according to the particular pixel format used.

Figure 5:
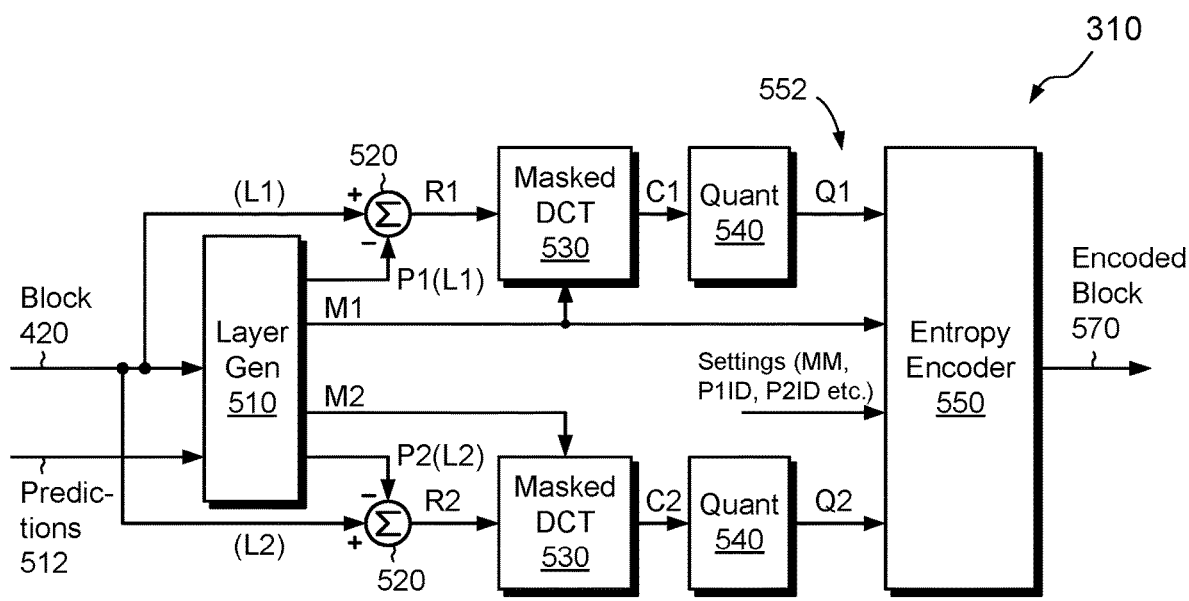
FIG. 5 is a block diagram of an example video encoder, which may be used in the layering codec of FIG. 3.

FIG. 5 shows an example encoder 310 in additional detail. Unlike encoders in conventional codecs, the encoder 310 generates multiple layers that are each amenable to higher compression ratios while reducing or eliminating noise around high-contrast edges. Although the encoder 310 can operate by producing any number of layers, the example of FIG. 5 assumes for simplicity that the encoder 310 generates two layers.

The encoder 310 is seen to include a layer generator 510 and an entropy encoder 550, as well as two each of a summer 520, a masked DCT operator 530, and a quantizer 540. An additional summer 520, masked DCT operator 530, and quantizer 540 may be provided for each additional layer, if greater than two layers are desired.

In operation, the layer generator 510 receives a current block 420, as well as predictions 512. The predictions 512 may include any number of different predictions of the current block 420, including, for example, intra-frame predictions and/or inter-frame predictions. In an example, the encoder 310 generates the predictions 512, e.g., based on previously encoded blocks 420 and/or based on input from the decoder 312a.

In response to receiving the block 420 and the predictions 512, the layer generator 510 outputs a group of the predictions 512, e.g., P1 and P2, as well as a pair of masks, e.g., M1 and M2. In some examples, as will be described infra, the predictions P1 and P2 themselves provide the layers L1 and L2. In other examples, the current block 420 provides the layers L1 and L2. The layer generator 510 generates the mask M1 for layer L1 and generates the mask M2 for layer L2.

The summers 520 each subtract, pixel-for-pixel, a respective prediction, P1 or P2, from the current block 420, to generate a respective residual block, e.g., R1 or R2. The summers 520 each perform their respective subtractions in a pixel-wise manner, such that the value at each pixel location in the residual block, R1 or R2, is the difference between the pixel value at the same location in the block 420 and the pixel value at the same location in the prediction, P1 or P2.

Each masked DCT operator 530 then performs a DCT (Discrete Cosine Transform) on the respective residual block, R1 or R2, to generate a respective set of DCT coefficients, C1 or C2. Significantly, each masked DCT operator 530 receives a respective mask, M1 or M2, as input and generates the DCT coefficients, C1 or C2, based on both the respective residual block, R1 or R2, and the mask, M1 or M2. Although the illustrated example applies a Discrete Cosine Transform via DCT operator 530, it should be understood that the invention is not limited to Discrete Cosine Transforms and that other types of transforms may be used, such as Discrete Fourier Transforms, Discrete Sine Transforms, Discrete Wavelet Transforms, and so on.

Each quantizer 540 then performs rounding and/or truncation on C1 and C2, respectively, to produce quantized outputs Q1 and Q2. Each quantizer 540 reduces the granularity of its respective input, C1 or C2, and thus introduces losses, preferably in a manner that minimizes impact on the subjective viewing experience of the user. In some examples, the quantizer 540 reduces any non-zero coefficients by a scaling factor, to express Q1 and Q2 as smaller numbers that are more compressible.

The entropy encoder 570 then applies lossless compression, such as Huffman encoding, arithmetic encoding, or the like, to the quantized outputs, Q1 and Q2, to generate an encoded block 570, which is thus a compressed version of the current block 420. The entropy encoder 570 also preferably receives and encodes the mask M1 (and optionally M2), as well as various settings, which are also reflected in the encoded block 570. The settings include an identifier of each of the predictions P1 and P2 (i.e., P1ID and P2ID) used to generate the residual blocks R1 and R2, as well as a merge mode (MM). As will become apparent, providing identifiers P1ID and P2ID in the encoded block 570 allows a decoder 312 to replicate the predictions P1 and P2 to regenerate the layers L1 and L2. The predictions P1 and P2 may include intra-frame predictions, inter-frame predictions, and/or other types of predictions. The prediction identifiers P1ID and P2ID may include displacement vectors, motion vectors, and/or information about prediction settings and/or modes, which the encoder 310 uses to generate the predictions P1 and P2 and which the decoders 312 and 312a may use to perform the same predictions. The merge mode (MM) specifies the manner in which the decoder 312 should reconstruct the block 420 using the layers L1 and L2, e.g., whether pixels in one layer should replace those in another layer or be blended therewith.

In an example, the masks M1 and M2 are binary masks, which each provide a 1-bit value for a respective layer (L1 or L2) at each pixel location in the current block 420. The 1-bit value for a pixel indicates whether the decoder 312 should use that respective layer (L1 or L2) in reconstructing the current block 420. For example, a mask value of "1" for a given pixel location and layer means that the decoder 312 should use the pixel value for that pixel location and layer in reconstructing the current block. Conversely, a mask value of "0" means that the decoder 312 should not use the pixel for reconstructing the current block 420. As will be described infra, the encoder 310 can exploit areas of no interest as identified by the masks M1 and M2 to reduce the number of non-zero DCT coefficients that the masked DCT operators 530 produce, and/or to otherwise simplify DCT coefficients, and thus to further improve compression ratios.

Although binary masks may be used in certain implementations, it should be understood that each mask may alternatively be provided as a multi-bit mask having multiple bits per pixel. In some examples, providing multi-bit masks affords the decoders 312/312a the opportunity to combine layers using alpha blending or other blending techniques. Also, although the illustrated example provides a single merge mode to be applied on a per-block basis, this is not required. For example, merge modes may be provided on a per-layer basis, for defining how each layer should be combined with any previous layers, or even on a per-pixel basis, to define how that pixel should be combined with corresponding pixels of previous layers.

It is generally not necessary for the encoder 310 to encode both masks M1 and M2. Rather, in some examples, the layer generator 510 produces binary masks that are mutually exclusive of one another, such that it is possible to send one fewer mask for a current block 420 than there are layers. If the layer generator 510 generates only two layers, then only the first mask (e.g., M1) need be encoded, with the second mask (M2) being computable as the pixel-wise inverse of the first mask (M1). More generally, if the encoder 310 generates M different masks for M layers, then only M−1 masks are typically represented in the encoded block 570, with the M-th mask being computable directly as the pixel-wise logical-NOR of all of the M−1 masks provided in the encoded block 570. In some variants, it is not necessary for the decoder 312/312a to generate the M-th mask. For example, when reconstructing a current block, the decoder 312/312a can simply apply the first layer without a mask, and then apply one or more subsequent layers using respective masks for those layers.

In some examples, the encoder 310 losslessly compresses the mask M1 (or multiple masks), such that the decoder 312 can recover the masks with perfect fidelity. Lossless compression of masks prevents noise from appearing in reconstructed images at mask boundaries. Assuming each mask preferably has only 1 bit per pixel, lossless encoding of masks adds only minimally to the overall cost of compression and has a small effect on overall compression ratio. Also, many masks tend to have large, continuous areas, where the masks are either all "0" or all "1." As lossless compression techniques can benefit from uniform regions to improve compression ratios, the internal structure of masks tends to make the contribution of masks to the overall cost of compression even less significant. Although lossless compression of masks tends to yield the best reconstruction, it should be understood that lossy compression of masks may be used in applications where noise at mask boundaries is found to be negligible or unimportant.

In some examples, the encoder 310 may use predictions for encoding the masks, as well. For example, the encoder 310 generates predictions of the masks and subtracts the predictions from respective complete masks (e.g., M1 or M2) to produce residual masks. The entropy encoder 550 encodes the residual masks, requiring less data to do so than would be required to encode the complete masks. In such situations, the encoder 310 may provide a prediction mode for each mask in the encoded block 570. When the decoder 312 receives the encoded block 570, the decoder 312 can access the prediction modes and replicate the mask predictions. The decoder 312 can then subtract the mask predictions from respective the residual masks to reconstruct the complete masks. Of course, if the encoder 310 uses only two masks, then only one residual mask will be needed, or, in general, one fewer residual mask will be needed than the number of layers.

Figure 6A:
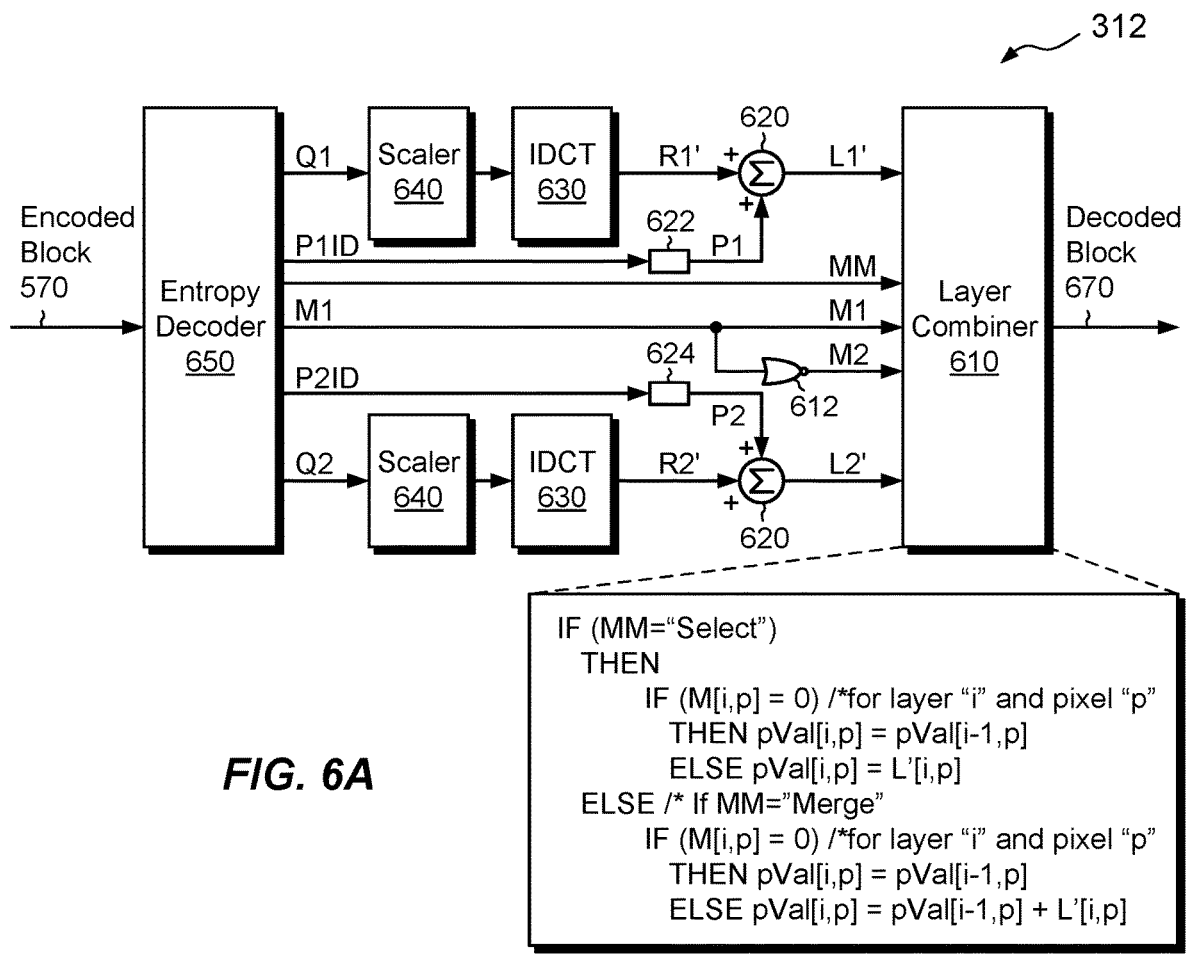
FIGS. 6A and 6B are block diagrams of example video decoders, which may be used in the layering codec of FIG. 3.
Figure 6B:
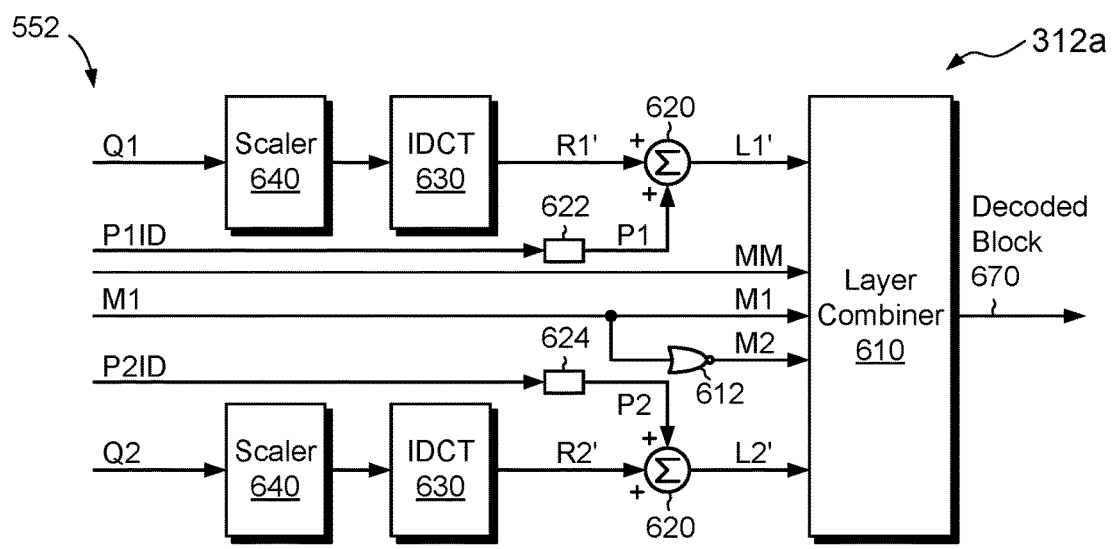

FIG. 6A shows an example implementation of the decoder 312 in additional detail. FIG. 6B shows an example implementation of the decoder 312a that accompanies the encoder 310. The decoders 312 and 312a differ in that the decoder 312a does not require an entropy decoder, as the decoder 312a is typically co-located with the encoder 310 such that entropy encoding is not required. The decoders 312 and 312a are otherwise similar or identical. It should be understood that, except for the details relating to entropy decoding, the operation described below for the decoder 312 applies equally to the decoder 312a.

The decoder 312 essentially reverses the encoding process performed by the encoder 310. An entropy decoder 650 performs lossless decompression of the encoded block 570 (FIG. 5) to recover the quantized outputs Q1 and Q2, as well as to recover the identifiers P1ID and P2ID of predictions P1 and P2, the mask M1, and the merge mode, MM. Predictors 622 and 624 respectively generate the predictions P1 and P2 locally by referencing P1ID and P2ID. A pixel-wise NOR operator 612 regenerates M2 from M1. If greater than two layers are provided for the encoded block 570, then masks for each of those layers, except a last layer, may be input to the pixel-wise NOR operator 612, with the output of the pixel-wise NOR operator 612 providing the last mask. If the encoded block 570 includes only two layers, the pixel-wise NOR operator 612 may be implemented as a pixel-wise inverter.

Each of the predictions P1 and P2 is a two-dimensional array of pixels and may provide an intra-frame prediction, and inter-frame prediction, or some other type of prediction. In an example, the decoder 312 maintains a record of previously reconstructed frames and previously reconstructed pixels in each current frame. The record may include reconstructed complete pixels as well as reconstructed layer pixels. For instance, if two layers are used, the decoder may maintain a record of (1) previously reconstructed first-layer pixel values for the current frame and previous frames, (2) previously reconstructed second-layer pixel values for the current frame and previous frames, and (3) previously reconstructed complete pixel values for the current frame and previous frames. The prediction identifiers P1ID and P2ID may include displacement vectors and/or motion vectors, which point to block-sized arrays of previously-processed complete pixels and/or layer pixels. The decoder 312 can thus base its predictions P1 and P2 on previous arrays of complete pixels as well as on previous arrays of reconstructed layer pixels.

Scalers 640 undo any scaling of quantized DCT coefficients applied by quantizers 540, and IDCT operators 630 perform inverse-DCT operations to reconstruct residual blocks R1' and R2', which correspond to R1 and R2 in FIG. 5. Summers 620 then perform pixel-wise additions of predictions P1 and P2 from respective residual blocks R1' and R2', to generate reconstructed layers L1' and L2'. A layer combiner 610 receives the layers L1' and L2', the masks M1 and M2, and the merge mode MM, and generates therefrom a decoded block 670. The decoded block 670 is a decoded version of the encoded block 570 and represents a reconstruction of the original, current block 420 (FIG. 5). The decoder 312 may repeat these activities on multiple encoded blocks 570 to reconstruct the original portion 410 of the video signal (FIG. 4).

The layer combiner 610 combines layers L1' and L2' in a pixel-wise manner based on the specified merge mode MM to generate the decoded block 670. Reconstruction begins with the lowest layer (L1') and builds layer-upon-layer. In the example shown, layers and masks are described with subscripts [i,p], where "i" identifies a particular layer (here, L1' or L2') and "p" indicates a particular two-dimensional pixel location relative to the current block. As before, "M" refers to a mask and L' refers to a layer.

As indicated in the illustrated example, the merge mode MM may assume one of two values: "Select" or "Merge." Other examples may provide additional modes or different modes. In "Select" mode, the layer combiner 610 selects, on a pixel-by-pixel basis, whether a current pixel value "pVal" being prepared for the decoded block 670 should be set to the pixel value at the same pixel location in the previously processed layer (if there is one), or should be set to the value at that location in the current layer. The layer combiner 610 performs this selection based on the value of the mask for the currently processing layer. The operation for MM="Select" may be expressed with the following pseudo-code:

```
IF (M[i,p] = 0)                    /*mask for layer "i" and pixel "p"
    THEN pVal[i,p] = pVal[i-1,p]   /*the value for the previous layer
    ELSE pVal[i,p] = L'[i,p]       /*the value for the current layer
```

In "Merge" mode, by contrast, the layer combiner 610 determines, on a pixel-by-pixel basis, whether the current pixel value "pVal" being prepared for the decoded block 670 should be set to the pixel value at the same pixel location in the previously processed layer (if there is one), or should be set to a combination of the previous pixel value and the value of the current layer. Again, the decision is based on the mask. The operation for MM="Merge" may be expressed as follows:

```
IF (M[i,p] = 0)                         /*mask for layer "i" and pixel "p"
    THEN pVal[i,p] = pVal[i-1,p]        /*the value for the previous layer
    ELSE pVal[i,p] = pVal[i-1,p]+L'[i,p] /*a combination of the value for
``` the previous layer and the value
for the current layer*/

Although the above-described merging operation is achieved by computing a simple sum of pVal[i−1,p]+L'[i,p], it is understood that weighted sums or other methods of blending pixel values may be used.

As there is no "previous layer" for the first layer (L1'), pVal[first,p] is simply L'[first,p] for all values of "p" (i.e., for all pixel locations of L1'). The process defined by the pseudocode above is then performed one layer at a time for all pixels in each successive layer, until all layers have been processed in order. Once all pixels of the last layer have been processed, the layer combiner 510 provides the values of pVal[last,p] as pixels values at respective pixel locations in the decoded block 670.

In a more general sense, it should be understood that the layer combiner 610 may perform any operation ("op") for combining layers, where $$p\text{Val}[i,p] = \text{op}(p\text{Val}[i,p], p\text{Val}[i-1,p], L'[i,p], M[i,p]).$$

The operation may depend on a merge mode, but this is not required. In addition, it is not necessary that the layer combiner 610 combine layers in succession, i.e., where each pVal is accumulated one layer at a time beginning with the first layer and proceeding until the last. For example, the layer combiner 610 may compute each pVal as a function of multiple layers and masks all at once. Further, the layer combiner 610 may combine some layers all at once to produce intermediate results, but may then combine the intermediate results one at a time. Many variations are contemplated.

It should be understood that implementation details of the decoders 312 and 312a may be varied. For example, the IDCT operators 630 may be replaced with other types of inverse-transform operators, so as to perform the inverse of whatever transform is used by the encoder 310. The scalers 640 need only be present if the quantizers 540 introduce a scale factor in quantized coefficients Q1 and Q2; otherwise, they may be omitted. The pixel-wise NOR operator 612 may be eliminated if the M-th mask is not used in reconstructing the decoded block 670 or if the masks use multi-bit values instead of 1-bit values. In addition, although the layer combiner 610 is shown to combine layers using the particular modes and manners described, the layer combiner 610 is not limited to these particular modes and manners and may operate to combine layers in any suitable way.

Figure 7A:
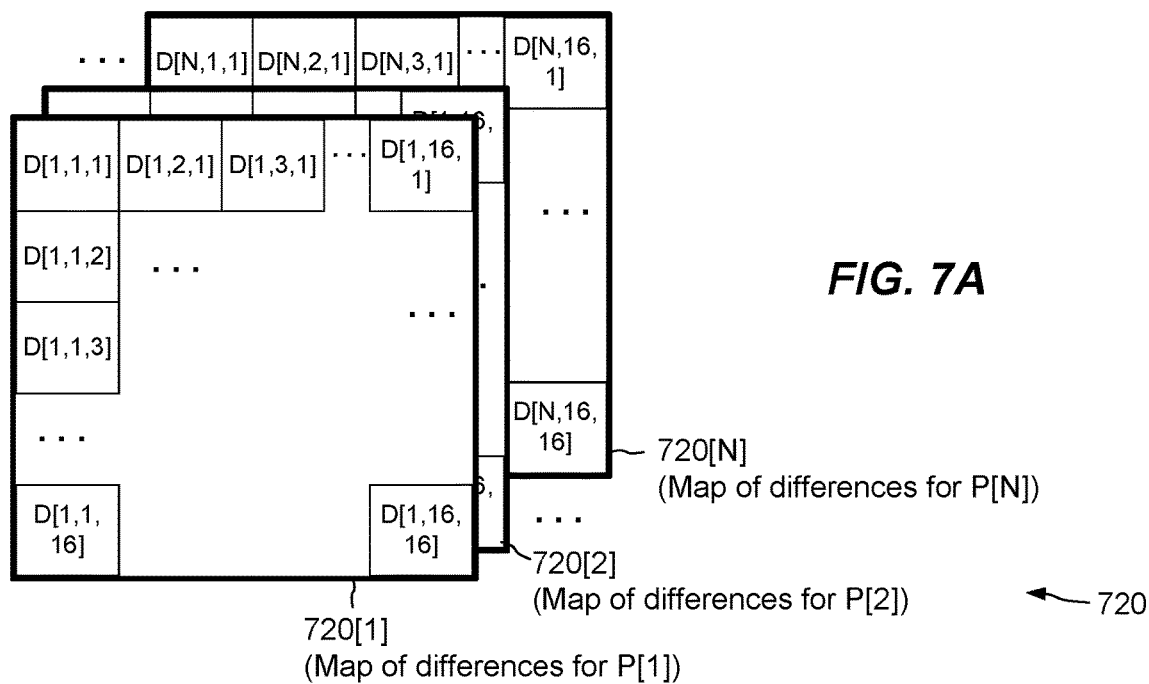
FIGS. 7A and 7B are, respectively, an illustration of multiple example maps of differences between predictions of the current block and the current block itself, and a flowchart showing an example process for selecting layers to represent the current block based on the predictions.
Figure 7B:
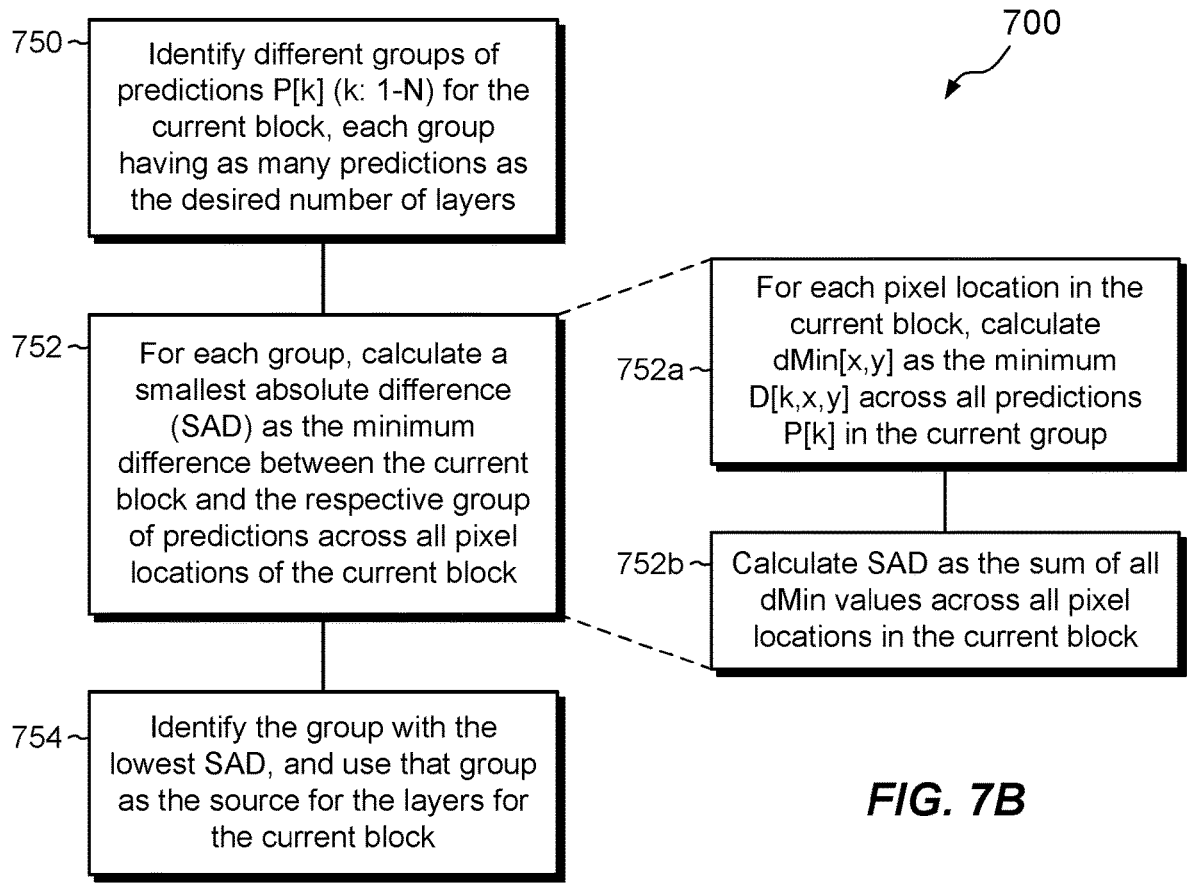

FIGS. 7A and 7B respectively show difference maps 720 and an example process 700 for generating layers to be used for encoding a current block 420. In an example, the process 700 is conducted by the layer generator 510 of the encoder 310 (FIG. 5). In general overview, the process 700 identifies a specific group of predictions from among the predictions 512, which the encoder 310 then applies as the layers for encoding the current block 420.

FIG. 7A shows an example illustration of difference maps 720. Each of the difference maps 720[k] (k:1–N) represents a pixel-wise difference between a current block 420 (FIG. 5) and a respective prediction P[k], i.e., one of the predictions 512 input to the layer generator 510 (FIG. 5). A total of "N" difference maps 720[1] to 720[N] are shown, one for each of N predictions. Each difference map 720 represents, for each pixel location in the current block 420, a respective difference value D[k,x,y], where "k" is a prediction index and "x" and "y" are column and row coordinates, respectively. If cb[x,y] is taken to be the current block 420, then each value of D[k,x,y] may be computed as follows:

$$D[k,x,y] = \text{ABS}(cb[x,y] - P[k,x,y]),$$

where, "ABS" indicates absolute value and "x" and "y" have been added as subscripts to P[k] to indicate pixel locations in the respective prediction.

Proceeding now to 750 in FIG. 7B, it is seen that the layer generator 510 of the encoder 310 identifies all possible unique combinations (groups) of predictions P[k] for the current block 420. Each group of predictions includes the same number of predictions as the desired number of layers that the encoder 310 will use when encoding the current block 420. For example, if the encoder 310 will use "numL" layers to encode the current block 420, then the layer generator 510 identifies all possible unique combinations of numL predictions each from among the "N" predictions. Using standard statistical methods, it can be seen that the layer generator 510 generates a total of N!/(N−numL)! groups of predictions. Thus, for example, if the encoder 310 uses two layers (numL=2) to encode the current block 420 and there are a total of ten predictions 512 to choose from (N=10), then the layer generator 510 generates 10!/8!=45 different groups, with each group including a unique combination of two predictions, P[k]. Of course, it is not always necessary to generate all possible unique groups of predictions all the time. Thus, identifying all possible groups should be regarded as merely illustrative.

At 752, the layer generator 510 calculates, for each group identified at 750, a smallest absolute difference (SAD). The layer generator 510 calculates the SAD for each group of predictions as the minimum difference between the current block 420 and the respective group of predictions across all pixel locations of the current block 420.

For example, and as indicated at 752a, the layer generator 510 calculates, for each pixel location [x,y] in the current block 420, a value "dMin" that equals the minimum D[k,x,y] (FIG. 7A) across all predictions P[k] that belong in the current group. If the current group consists of two predictions, identified by indices "i" and "j," then dMin can be expressed for each pixel location [x,y] as follows:

$$d\text{Min}[x,y] = \text{MIN}(D[i,x,y], D[j,x,y]),$$

where "MIN" is a function that computes the minimum of its operands. The above equation can easily be adapted to include greater than two predictions per group by including additional terms within the parenthesis.

At 752b, the layer generator 510 computes SAD for the current group as the sum of all dMin values across all pixel locations [x,y] in the current block 420. Continuing with the above example, $$\text{SAD}(i,j) = \Sigma d\text{Min}[x,y]$$

across all pixels locations [x,y] in the current block 420. The computation of SAD is then repeated for each unique group identified at 750.

At 754, the layer generator 510 identifies the group, from among the groups identified at 750, that has the lowest value of SAD. The group with the lowest SAD is thus the group that, overall, most closely predicts the current block 420.

The layer generator 510 then uses the identified group with the lowest SAD as the source of layers for encoding the current block 420. For example, if the group with the lowest SAD includes two predictions, P[1] and P[2], then the layer generator 510 uses P[1] as the layer L[1] and P[2] as the layer L[2].

Thus, the process 700 generates layers by creating unique groups of predictions, finding the group that most closely approximates the current block 420, and using the predictions in that group to provide the layers that the encoder 310 uses to encode the current block 420.

Figure 8A:
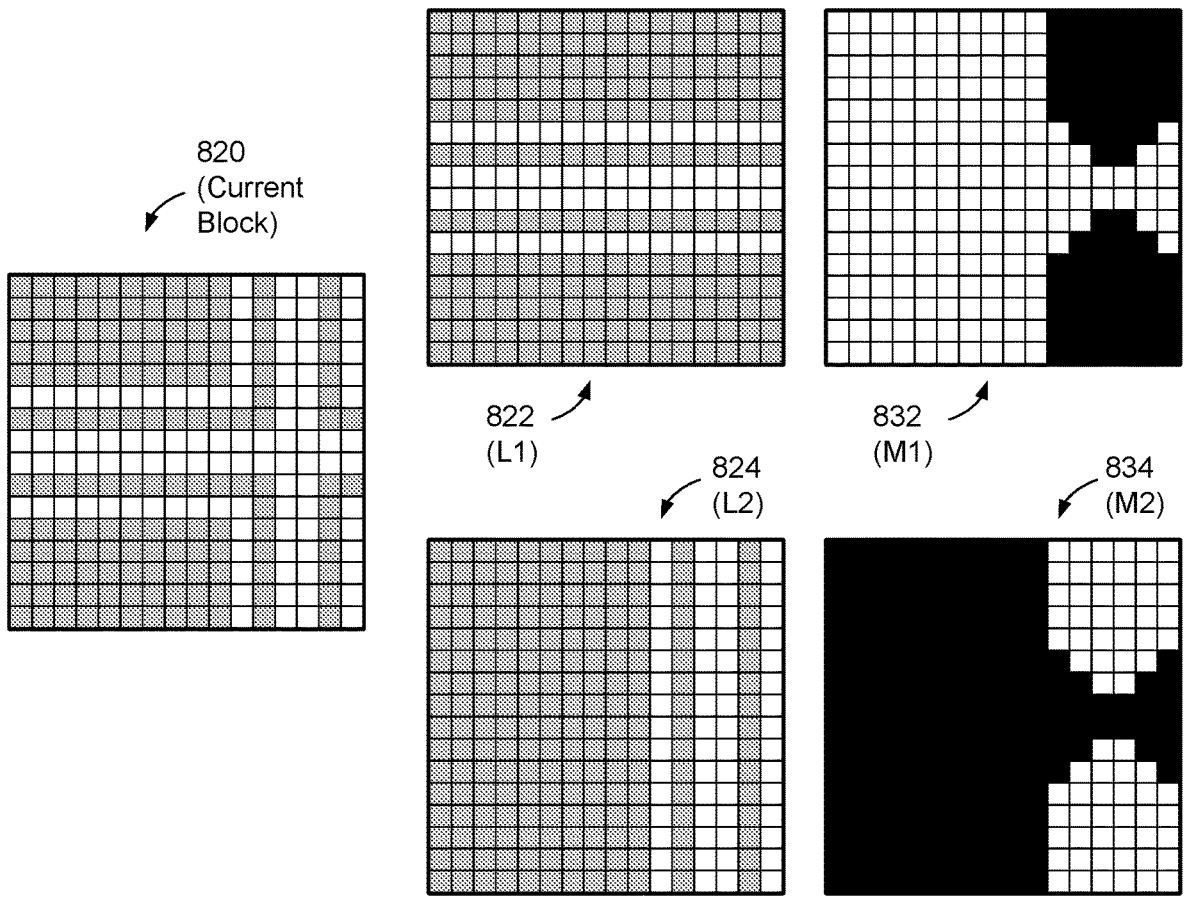
FIGS. 8A and 8B are, respectively, an illustration of layers and masks used to encode a current block, where the layers are selected from intra-frame predictions of the current block, and a flowchart showing an example process for establishing settings of the mask for each layer.
Figure 8B:
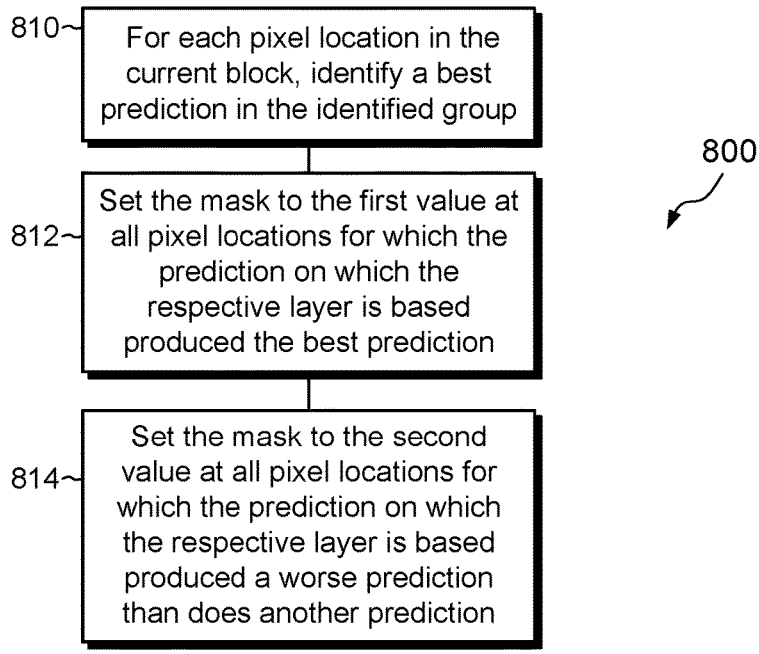

FIGS. 8A and 8B show an example whereby the layer generator 510 generates two layers L1 and L2 by prediction, e.g., using the process 700 above. Also, a process 800 (FIG. 8B) provides an example technique for establishing masks M1 and M2 corresponding to the layers L1 and L2, respectively.

At FIG. 8A, a current block 820 is provided as input to the encoder 310 and includes lines that cross at right angles. For instance, the current block 820 may be a block from a video signal that includes a line drawing shared during a web conference (e.g., via screen sharing). To encode the block 820, the layer generator 510 may identify a group (e.g., the group with the lowest SAD in the process 700) consisting of two intra-frame predictions. A first intra-frame prediction 822 may be based on a previously-processed block immediately to the left of the current block 820, e.g., such that the prediction simply takes the right-most column of pixels in the previous block and extends it across the current block 820. Likewise, a second intra-frame prediction 824 may be based on a previously-processed block immediately above the current block 820, e.g., such that the prediction takes the bottom row of pixels in the block directly above the current block 820 and extends it down and through the current block 820. The layer generator 510 uses the predictions 822 and 824 as the layers L1 and L2, respectively, and generates respective masks 832 (M1) and 834 (M2). The mask 822 (M1) has a value of "1" (white) for each pixel location in the current block 820 for which L1 more closely approximates the value of the pixel than does L2. The mask 822 (M1) has a value of "0" (black) at pixel locations where another prediction produces a closer value. Likewise, the mask 824 (M2) has a value of "1" (white) for each pixel location in the current block 820 for which L2 more closely approximates the value of the pixel than does L1. The mask 824 (M2) has a value of "0" (black) at pixel locations where another prediction produces a closer value.

FIG. 8B shows an example process for setting the masks M1 and M2 in additional detail. At 810, the layer generator 510 identifies, for each pixel location, a best prediction in the identified group, with the identified group being the group that has the lowest SAD. For example, for pixel [1, 6] of the current block 820, the best prediction in the identified group, which includes predictions 822 and 824, is prediction 822, as prediction 822 more accurately represents pixel [1,6] than does prediction 824.

At 812, the layer generator 510 sets the mask to the first value (e.g., "1") at all pixel locations for which the prediction on which the respective layer is based produced the best prediction. Thus, for example, the layer generator 510 sets the mask 832 (M1) to "1" (white) at all pixel locations [x,y] at which prediction 822 does a better job of predicting the current block 820 than does prediction 824.

At 814, the layer generator 510 sets the mask to the second value (e.g., "0") at all pixel locations for which the prediction on which the respective layer is based produced a worse prediction than does another prediction. For example, the layer generator 510 sets the mask 832 (M1) to "0" (black) at all pixel locations [x,y] at which prediction 822 does a worse job of predicting the current block 820 than does prediction 824. The layer generator 510 can then compute second mask 834 (M2) as the pixel-wise inverse of the first mask 832 (M1).

The encoder 310 then processes the layers and masks, as described in connection with FIG. 5, to encode the current block 820. In an example, the encoded block 820 includes a set of video data describing the quantized layers (Q1 and Q2), the mask M1, a merge mode "select," and prediction information P1ID and P2ID. The prediction information specifies that intra-frame prediction is used for each of the layers and provides information about the previous pixel values, i.e., the right-most column of pixels from the block immediately to the left for L1 and the bottom-most row of pixels from the block immediately above for L2. The encoder 310 then sends the encoded block 570 to one or more decoders, which receive the set of video data and generate a reconstructed block as described in connection with FIGS. 6A and 6B. For example, a decoder 312 performs entropy decoding, scaling, and IDCT operations to recover residual blocks. The decoder also applies the prediction information P1ID and P2ID to locally generate predictions P1 and P2. The decoder then adds the residual blocks to the respective predictions to recover the layers (versions of 822 and 824), and combines the layers using the received "select" mode to reconstruct the current block 820.

It should be noted that, for some pixel locations, multiple predictions may produce the same "best predictions." In such cases, the layer generator 510 may set values in such masks in any suitable way. For example, the layer generator 510 may preferentially group together equal mask values in close spatial proximity to one another to facilitate subsequent entropy encoding. Thus, if it makes no difference in accuracy which mask has the "1" and which has (or have) the "0" at a given pixel location, the layer generator 510 may place the "1" on the mask that has other "1's" in the same vicinity.

Figure 9A:
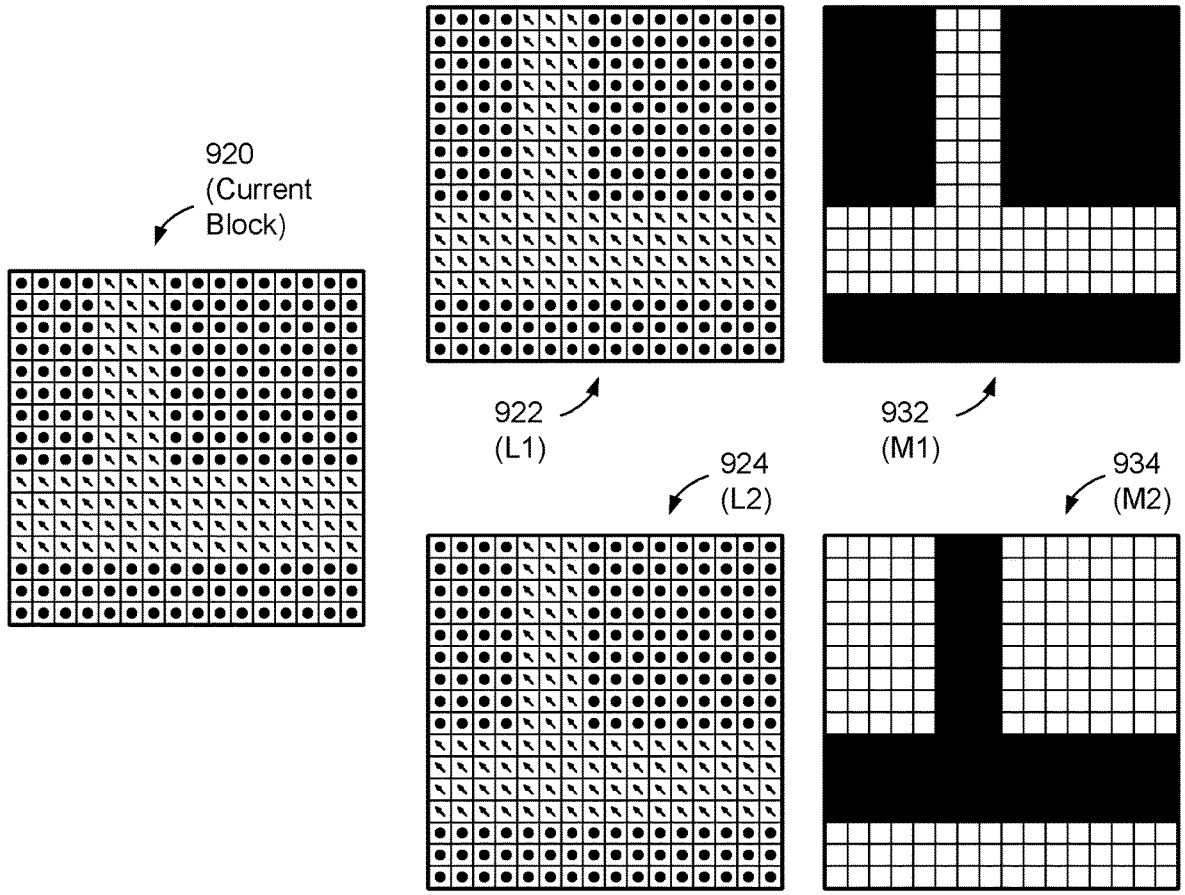
FIGS. 9A and 9B are, respectively, an illustration of layers and masks used to encode a current block, where the layers are selected from inter-frame predictions of motion vectors for the current block, and a flowchart showing an example process for establishing settings of the mask for each layer.
Figure 9B:
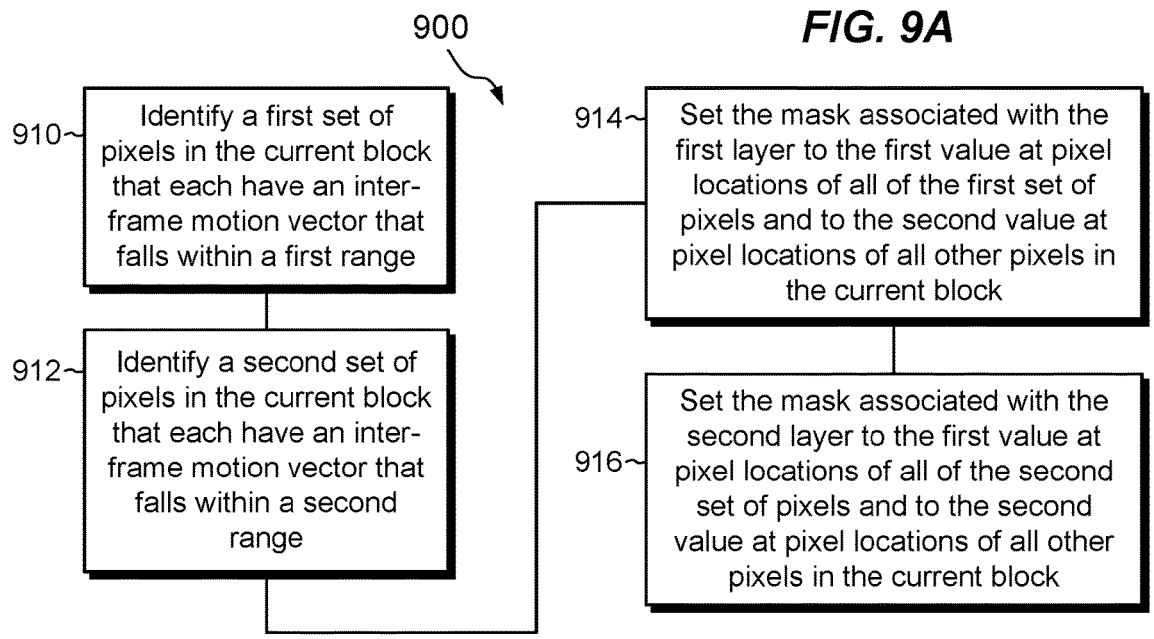

FIGS. 9A and 9B show an example illustration and process 900 whereby the layer generator 510 generates two layers 922 (L1) and 924 (L2) based on inter-frame predictions of a current block 920. In an example, the layer generator 510 performs the process 900 for blocks found in P-frames of video signals, i.e., in frames that identify changes relative to other frames.

As shown in FIG. 9A, the current block 920 has a motion vector associated with each pixel location. Motion vectors are illustrated as arrows (or dots) in block 920. Each motion vector has a magnitude and a direction and points to a pixel in a preceding frame. Each motion vector reflects a prediction made by the encoder 310 that the pixel value in the current block 920 will be the same as the pixel value pointed-to by the motion vector. A dot appearing in a pixel location means that the motion vector points to the same pixel location in a previous frame. The particular example pattern of dots and arrows is highly suggestive of a foreground object moving relative to a stationary background object.

The layer generator 510 may exploit motion vectors that fall within different ranges to assign foreground and background content to different layers. In the example shown, the layer generator 510 uses the current block 920 as the source of both layers 922 (L1) and 924 (L2) and generates the masks 932 (M1) and 934 (M2) to distinguish between foreground and background content.

For example, the layer generator 510 may generate the mask 932 (M1) based on motion vectors to include foreground pixels and to exclude background pixels. Likewise, the layer generator 510 may generate the mask 934 (M2) based on motion vectors to include background pixels and to exclude foreground pixels. Although the example of FIG. 9A shows a static background layer, it should be understood that the background layer may alternatively be moving relative to the current block 920, such that both layers reflect moving content, albeit in different directions. Further, separation of differently-moving content into respective layers can be extended to greater than two layers, e.g., to reflect any number of objects moving at different speeds and/or in different directions.

FIG. 9B illustrates an example process 900 for separating objects into layers and respective masks based on motion vectors in greater detail. At 910, the layer generator 510 identifies a first set of pixels in the current block that each have an inter-frame motion vector that falls within a first range. For example, with reference back to FIG. 9A, the layer generator 510 identifies a first set of pixels as those with motion vectors that point up and to the left.

At 912, the layer generator 510 identifies a second set of pixels in the current block that each have an inter-frame motion vector that falls within a second range. For example, the layer generator 510 identifies a second set of pixels as those with motion vectors that each point to the same locations, or to nearly the same locations (e.g., as represented by dots).

At 914, the layer generator 510 sets the mask associated with the first layer to the first value at pixel locations of all of the first set of pixels and to the second value at pixel locations of all other pixels in the current block. For example, the layer generator 510 sets the mask 932 (M1) for layer 922 (L1) to "1" (white) at all pixel locations where the motion vectors point up and to the left and to "0" (black) elsewhere.

At 916, the layer generator 510 sets the mask associated with the second layer to the first value at pixel locations of all of the second set of pixels and to the second value at pixel locations of all other pixels in the current block. For example, the layer generator 510 sets the mask 934 (M2) for layer 924 (L2) to "1" (white) at all pixel locations where the motion vectors point nowhere (to the same pixel locations) and to "0" (black) elsewhere. Of course, if the encoder 310 uses only two layers, then the layer generator 510 can compute second mask 934 (M2) as simply the pixel-wise inverse of the first mask 932 (M1).

The encoder 310 then processes the layers and masks, as described in connection with FIG. 5, to encode the current block 920. In an example, the encoded block 920 includes a set of video data describing the quantized layers (Q1 and Q2), the mask M1, a merge mode "select," and prediction information P1ID and P2ID. In this example, the prediction information specifies that inter-frame prediction is used for each of the layers and provides information about the previous pixel values, i.e., motion vectors relative to a previous frame. The encoder 310 then sends the encoded block to one or more decoders, which receive the set of video data and generate a reconstructed block as described in connection with FIGS. 6A and 6B.

Figure 10A:
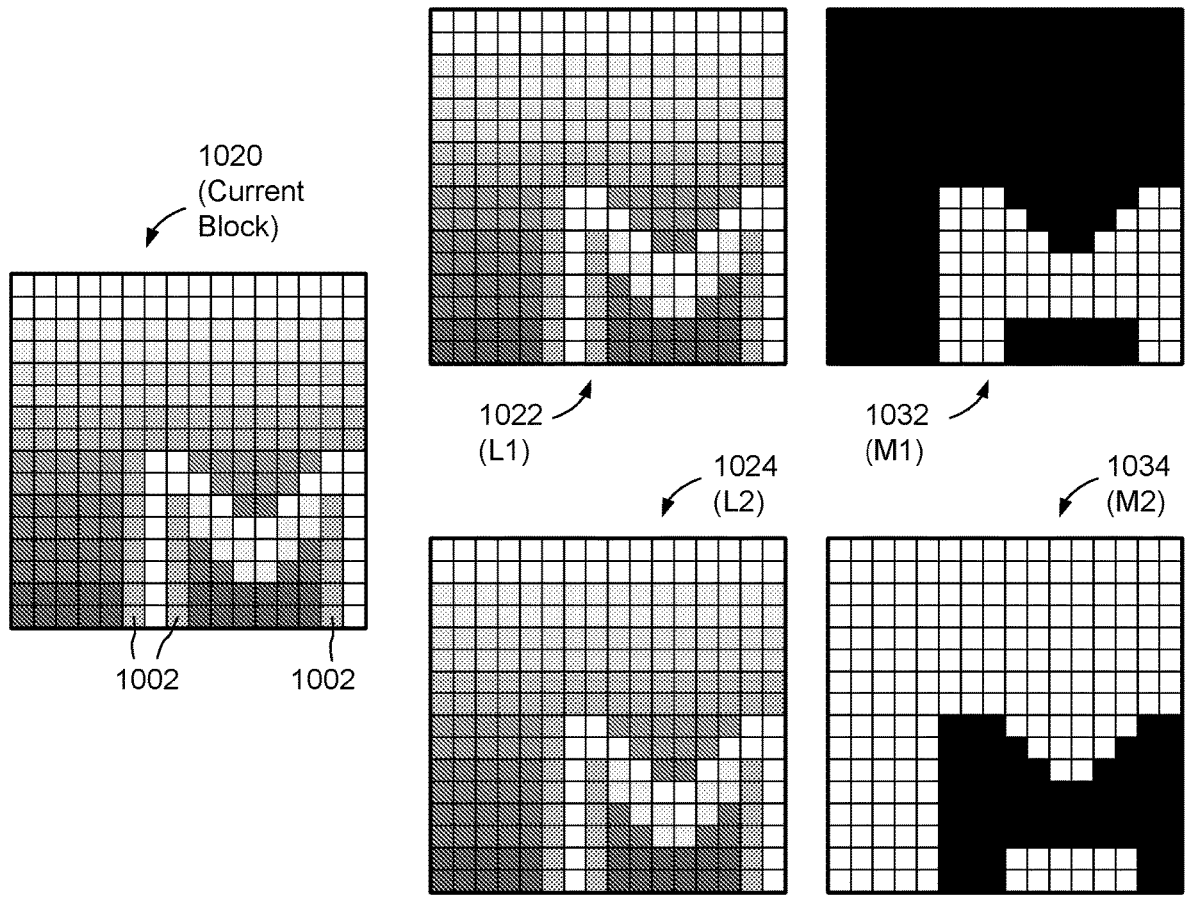
FIGS. 10A and 10B are, respectively, an illustration of layers and masks used to encode a current block, where the layers are selected by distinguishing foreground pixels from background pixels using edge detection, and a flowchart showing an example process for establishing settings of the mask for each layer.
Figure 10B:
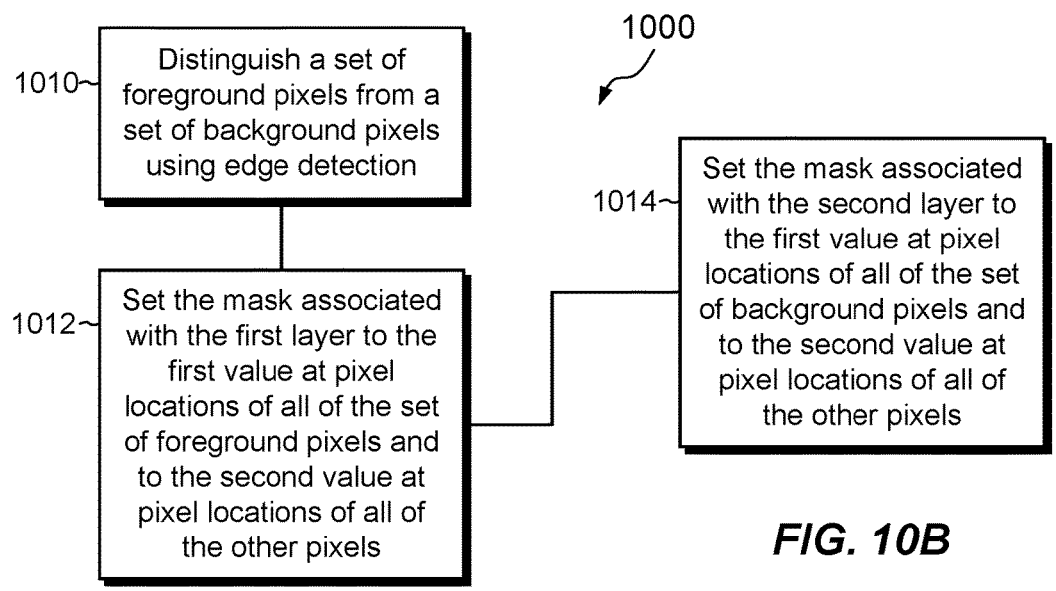

FIGS. 10A and 10B show an example illustration and process 1000 whereby the layer generator 510 generates two layers 1022 (L1) and 1024 (L2) by performing edge detection on a current block 1020. Here, it is seen that the current block 1020 includes pixels representing a letter "M" appearing over a background, which itself is a gradient having pixel values that gradually change. The letter "M" appears in the current block 1020 with anti-aliased pixels 1002. As is known, video signals may employ anti-aliased pixels around text characters and other sharp features to make their edges appear smooth, rather than jagged, when observed by the human eye.

Here, the layer generator 510 uses the current block 1020 as the source of layers 1022 (L1) and 1024 (L2). The layer generator 510 then generates masks 1032 (M1) and 1034 (M2) to distinguish the character (letter "M") from the gradient background. In this example, the layer generator 510 sets the mask 1032 (M1) to include not only the main pixels that form the character, but also the anti-aliased pixels 1002. Thus, the mask 1032 (M1) is slightly over-inclusive.

In an example, the layer generator 510 generates the mask 1032 (M1) using an edge-detection process, such as a Sobel filter, for categorizing pixels into edge pixels that represent an anti-aliased part of the character and non-edge pixels, and uses a histogram of pixel values of the non-edge pixels to distinguish pixels that represent the character from pixels that represent the background.

Although not clearly shown in FIG. 10A, the changing background gradient may be visible to the human eye within the illustrated character, i.e., the character may include both a background component and a foreground component. To preserve both components in reconstructed images, the encoder 310 may set the merge mode (MM, see FIG. 5) to "Merge," such that background pixels may be blended with foreground pixels when reconstructing the block 1020.

An example process 1000 of separation by edge detection is shown in FIG. 10B. At 1010, the layer generator 510 distinguishes a set of foreground pixels from a set of background pixels using edge detection. Sobel filtering or other edge-detection methods may be used.

At 1012, the layer generator 510 sets the mask associated with the first layer to the first value at pixel locations of all of the set of foreground pixels and to the second value at pixel locations of all of the other pixels. For example, the layer generator 510 sets the mask 1032 (M1) to "1" at all pixel locations within the detected object (including anti-aliased pixels 1002) and sets the mask to "0" elsewhere.

At 1014, the layer generator 510 sets the mask associated with the second layer to the first value at pixel locations of all of the set of background pixels and to the second value at pixel locations of all of the other pixels. For example, the layer generator 510 sets the mask 1034 (M2) to "1" at all pixel locations outside the detected object and sets the mask to "0" elsewhere. Of course, when the encoder 310 uses only two layers, then the layer generator 510 can compute the second mask 1034 (M2) as simply the pixel-wise inverse of the first mask 1032 (M1).

The encoder 310 then processes the layers and masks, as described in connection with FIG. 5, to encode the current block 1020. In an example, the encoded block 1020 includes a set of video data describing the quantized layers (Q1 and Q2), the mask M1, a merge mode "merge," and prediction information P1ID and P2ID. The prediction information may specify either intra-frame or inter-frame prediction, whichever works best. The encoder 310 then sends the encoded block to one or more decoders, which receive the set of video data and generate a reconstructed block as described in connection with FIGS. 6A and 6B.

Figure 11A:
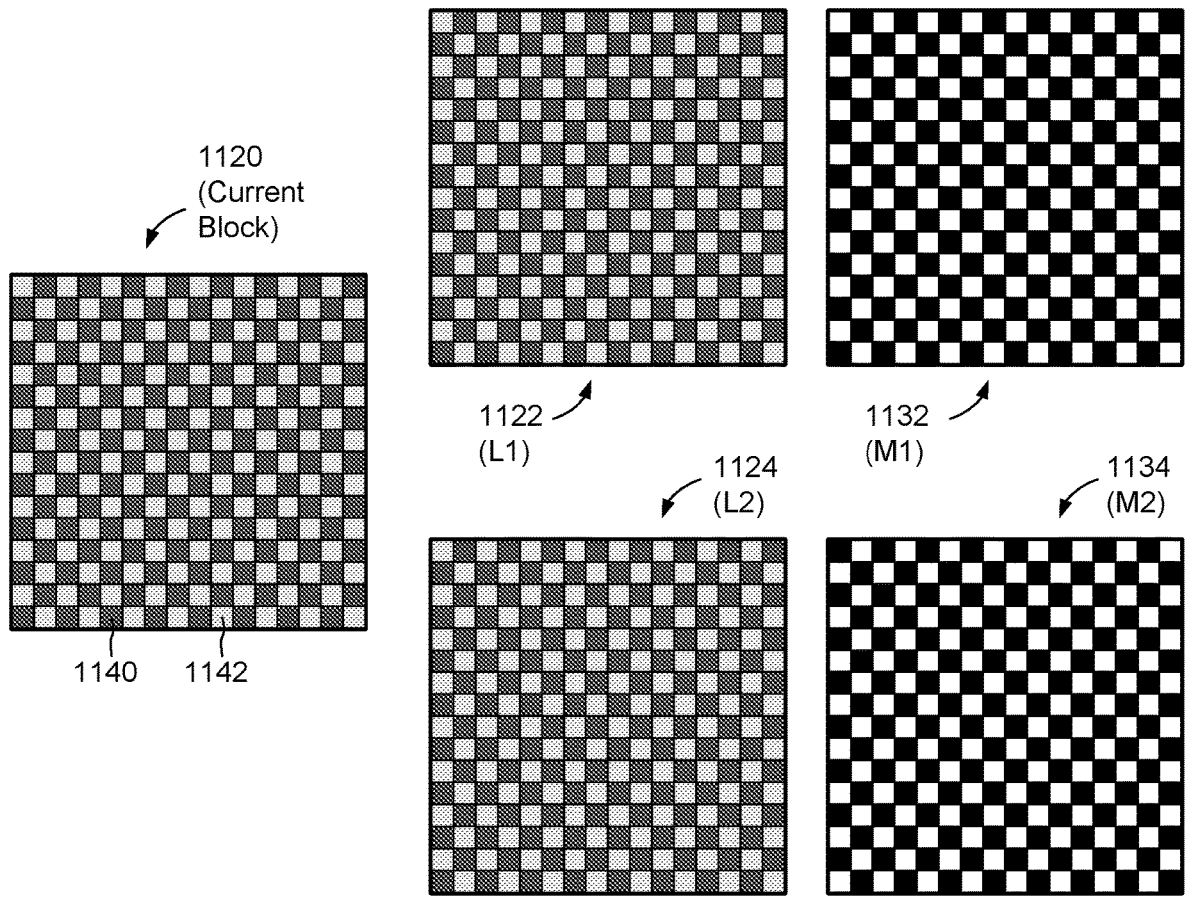
FIGS. 11A and 11B are, respectively, an illustration of layers and masks used to encode a current block, where the layers are selected based on colors of pixels in the current block, and a flowchart showing an example process for establishing settings of the mask for each layer.
Figure 11B:
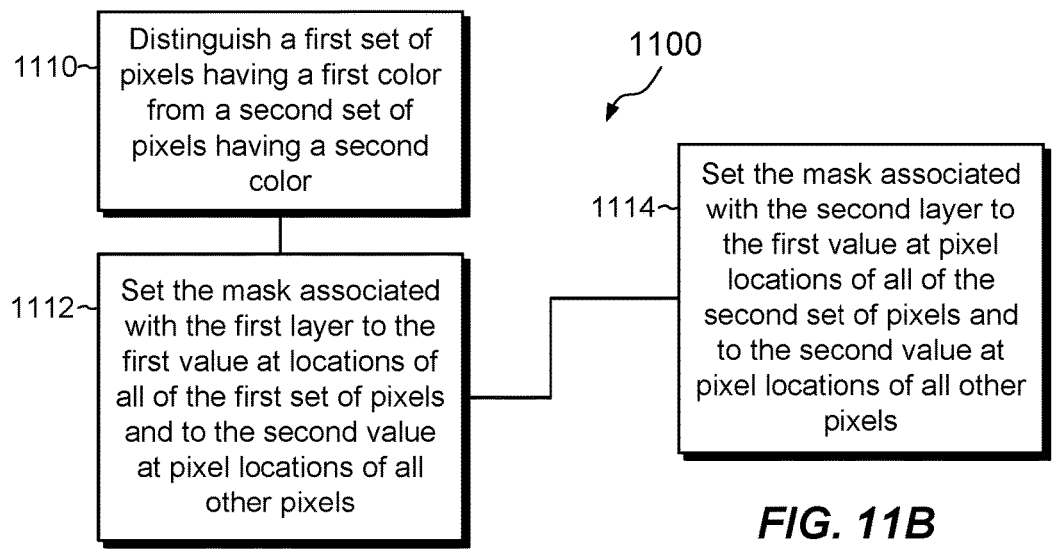

FIGS. 11A and 11B show an example illustration and process 1100 whereby the layer generator 510 generates two layers 1122 (L1) and 1124 (L2) by separating pixels of different colors in a current block 1120 into respective layers. Here, it is seen that the current block 1120 includes a checkerboard pattern of pixels of two different colors, e.g., a first color 1140 and a second color 1142. Once again, the layer generator 510 provides the current block (here, 1120) as the source for each of the layers, here, 1122 (L1) and 1124 (L2).

In this example, the layer generator 510 generates masks 1132 (M1) and 1134 (M2) such that each layer, once masked, includes pixels of only a single color. Of course, additional layers and masks can be provided for additional colors.

FIG. 11B shows an example process 1100 for separating pixels of the current block 1120 into layers and respective masks based on color. At 1110, the layer generator 510 distinguishes a first set of pixels having a first color from a second set of pixels having a second color. For example, the layer generator 510 distinguishes pixels having the color 1140 from pixels having the color 1142.

At 1112, the layer generator 510 sets the mask associated with the first layer to the first value at locations of all of the first set of pixels and to the second value at pixel locations of all other pixels. For example, the layer generator 510 sets the mask 1132 (M1) to "1" at all pixel locations where the pixel value is the first color 1140 and to "0" at all other pixel locations.

At 1114, the layer generator 510 sets the mask associated with the second layer to the first value at locations of all of the second set of pixels and to the second value at pixel locations of all other pixels. For example, the layer generator 510 sets the mask 1134 (M2) to "1" at all pixel locations where the pixel value is the second color 1142 and to "0" at all other pixel locations.

The encoder 310 then processes the layers and masks, as described in connection with FIG. 5, to encode the current block 1120. In an example, the encoded block 1120 includes a set of video data describing the quantized layers (Q1 and Q2), the mask M1, a merge mode "select," and prediction information P1ID and P2ID. In this example, the prediction information may specify predictions based on previously processed layers, such as layers of the same colors as those of the current layer. The encoder 310 then sends the encoded block to one or more decoders, which receive the set of video data and generate a reconstructed block as described in connection with FIGS. 6A and 6B.

FIG. 12A shows an example block diagram of the masked DCT operators 530 (FIG. 5) in additional detail. FIGS. 12B-12D show example processes 1200B, 1200C, and 1200D performed by the masked DCT operators 530 in computing DCT coefficients from respective residual blocks (e.g., R1 and R2 of FIG. 5).

As shown in FIG. 12A, the masked DCT operator 530 receives as input a residual block R[k] (e.g., R1, R2, etc.) and a corresponding mask M[k] (e.g., M1, M2, etc.) for a particular layer (e.g., L1 or L2; FIG. 5) and generates as output a set of DCT coefficients C[k] (e.g., C1, C2, etc.) for that layer. The masked DCT operator 530 is seen to include a separator 1210, a pixel generator 1212, and a DCT generator 1214. The DCT generator 1214 may be of any suitable type, such as a conventional, radix-2 DCT function, an integer DCT function, or any type of DCT function known to those skilled in the art or yet to be developed.

In example operation, and as shown in FIG. 12B, the separator 1210 identifies masked pixels in the residual block R[k] (e.g., those at pixel locations where the mask value for the current layer is "0") and provides their pixel locations 1220 to the pixel generator 1212 (at 1230). The separator 1210 also provides values of unmasked pixels (e.g., those at pixel locations where the mask is "1") to the DCT generator 1214. The pixel generator 1212 receives the pixel locations 1220 of the masked pixels and proceeds to generate alternative pixel values 1224, which the pixel generator 1212 provides to the DCT generator 1214 (at 1232). The DCT generator 1214 then generates DCT coefficients C[k] using both the unmasked pixel values 1222 and the alternative pixel values 1224 (at 1234).

Because the decoder 312 (or 312a) does not directly use masked-off pixels in reconstructing a current layer, values of masked-off pixels are largely irrelevant as far as the current layer is concerned. Indeed, values of masked-off pixels in most cases matter only to the extent that they may cause compression of residual blocks R[k] to be more or less efficient and/or may introduce noise into adjacent, unmasked pixels in the reconstructed layer. A proper role of the pixel generator 1212 is thus to generate alternative pixel values 1224, which can be substituted in place of the values of the masked-off pixels, and which, when encoded by the DCT generator 1214 and quantizer 540 (FIG. 5), result in improved compression and/or image quality.

The pixel generator 1212 may employ various techniques for generating alternative pixel values 1224. In some examples, the pixel generator 1212 inspects the unmasked pixel values 1222 in the current block (and may inspect pixels in other blocks, e.g., in the same frame and/or in different frames), and computes the alternative pixel values 1224 to make them consistent with the unmasked pixel values 1222. For example, referring briefly back to FIG. 11A, the pixel generator 1212 can compute the alternative pixel values 1224 for each layer so that they are the same color as that of the unmasked pixels for the same layer. Thus, the pixel generator 1212 can set the alternative pixel values 1224 for layer 1122 (L1) to the color 1142, such that all pixels acted upon by the DCT generator 1214 for encoding layer 1122 (L1) have the same color (1142). DCT coefficients C[1] resulting from operation of the DCT generator 1214 are thus all zero except for a single "DC" term for the color 1142. Likewise, the pixel generator 1212 can set the alternative pixel values 1224 for the layer 1124 (L2) to the color 1140, such that all of the pixels acted upon by the DCT generator 1214 have the same color (1140). Resulting DCT coefficients C[2] are thus all zero except for a single DC term that indicates the color 1140.

It should be understood that the pixel generator 1212 can use any suitable method to make alternative pixel values 1224 that are consistent with unmasked pixels 1222. For example, the pixel generator 1212 may employ prediction techniques and/or interpolation techniques. Such techniques may act in the spatial domain and/or in the frequency domain, and may operate so as to maximize, or at least to improve, compressibility and/or image quality. In some examples, an objective of the pixel generator 1212 is to set the alternative pixel values 1224 so as to maximize the number of zero-valued DCT coefficients among the coefficients C[k]. Maximizing the number of zero-valued DCT coefficients is also consistent with improving image quality, as doing so simplifies spectral content and tends to reduce ringing and other noise artifacts around transitions between layers. Thus, for example, text appearing over a background (e.g., as shown in FIG. 10A) can appear crisp and sharp, or at least as sharp as the source material, when reproduced by the decoder 312 (or 312a). The decoder 312 can reconstruct anti-aliased pixels around high-contrast edges clearly and without obscuring the edges with noise. Whereas conventional encoding schemes require a tradeoff between compression ratio and image quality, here it is seen that both can be achieved, at least for certain image content, without having to sacrifice one for the other.

Although it has been described that the pixel generator 1212 may be operated to maximize the number of zero-valued DCT coefficients, this is merely an example. For instance, the pixel generator 1212 may be operated in any manner that simplifies subsequent entropy encoding, results in higher compression ratios, and/or improves image quality.

In some examples, the pixel generator 1212 generates alternative pixel values 1224 in a manner that is particularly well-suited for radix-2, DCT operations. In the example shown in FIG. 12C, it is assumed that the DCT generator 1214 employs a radix-2 topology, in which multiple DCT operations are performed in stages where each stage receives two inputs and generates two outputs. In the conventional manner (e.g., as specified in H.265), the DCT generator 1214 combines and cascades the stages, with results of certain stages provided as input to other stages so as to perform an overall, two-dimensional DCT. Here, the DCT generator 1214 performs this radix-2 DCT operation on the unmasked pixel values 1222 and the alternative pixel values 1224, with each pixel value applied in its respective location.

As shown at 1240 of FIG. 12C, when the pixel generator 1212 detects that both inputs to a radix-2 DCT operation are masked pixels, e.g., are pixels located at any of the masked-off pixel locations 1220, then (at 1242) zeros are provided for both outputs of the radix-2 DCT operation. For example, the pixel generator 1212, upon detecting that both inputs to a radix-2 DCT operation are masked pixels, sets the inputs of the radix-2 DCT operation to zero, regardless of the pixel values normally provided, so as to ensure that the DCT operation produces a pair of zeros at its output.

FIG. 12D covers the scenario where one input to a radix-2 DCT operation is a masked pixel and the other is an unmasked pixel. The pixel generator 1212 detects this occurrence at 1250, and in response, replaces the pixel value of the masked pixel with the pixel value of the unmasked pixel (1252), such that the radix-2 DCT operation acts upon the same pixel value for the masked pixel as for the unmasked pixel. When both inputs of a radix-2 DCT operation are unmasked pixels, the pixel generator 1212 may make no change to the inputs, and the radix-2 DCT operation may proceed in the customary manner.

The processes of FIGS. 12C and 12D thus provide an efficient means of setting masked pixels to the same values as corresponding unmasked pixels when performing radix-2 DCT operations. Such processes thus tend to force pixel values at masked pixel location to be the same as pixel values at unmasked pixel locations, thus promoting pixel consistency within a block.

Figure 13:
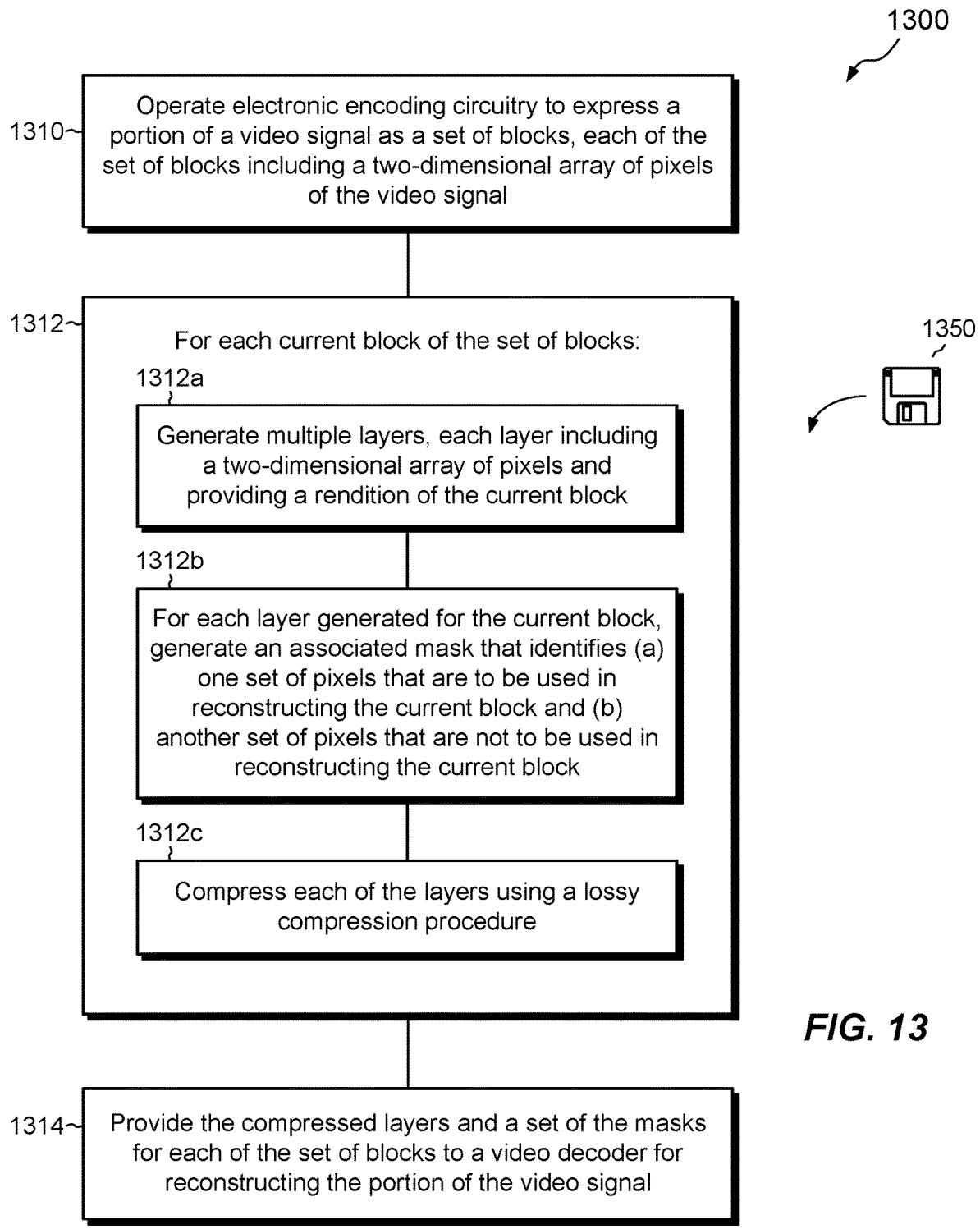
FIG. 13 is a flowchart showing an example process for encoding video signals.
Figure 14:
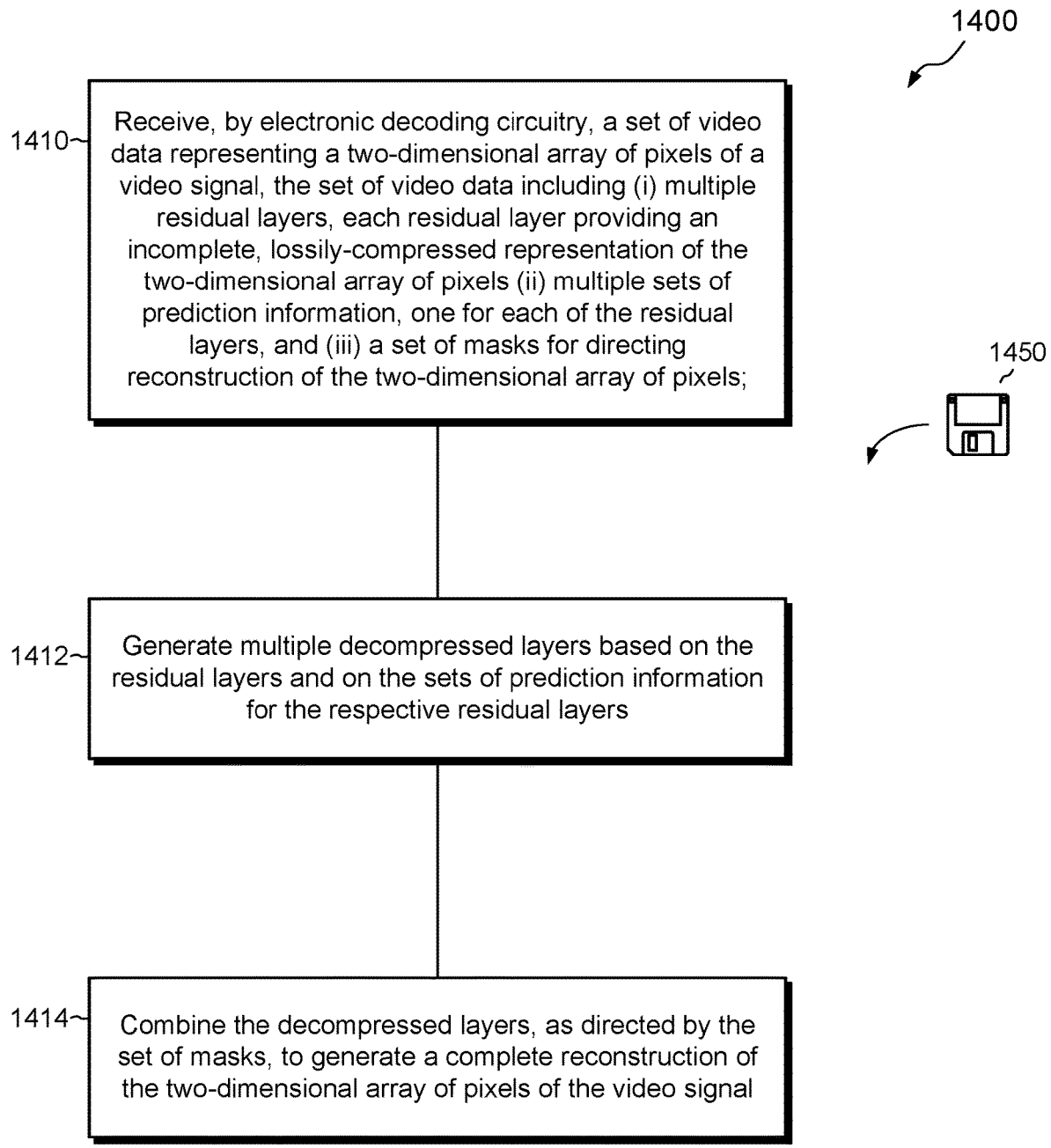
FIG. 14 is a flowchart showing an example process for decoding video signals.

FIGS. 13 and 14 illustrate example processes 1300 and 1400 that may be carried out in connection with the computing environment 100 and provide a summary of some of the above-described techniques. The processes 1300 and 1400 are typically performed by the software constructs, described in connection with FIG. 2, which reside in the memory 230 of the computerized apparatus 110 (or of multiple apparatuses) and are run by the set of processors 220. The processes 1300 and 1400 may alternatively be performed by special-purpose circuitry, specialized chips and/or processors, and so forth. The various acts of the processes 1300 and 1400 may be ordered in any suitable way. Accordingly, embodiments may be constructed in which acts are performed in orders different from those illustrated, which may include performing some acts simultaneously, even though the acts are shown as sequential in the illustrated embodiments.

FIG. 13 shows an example encoding process. At 1310, electronic encoding circuitry is operated to express a portion of a video signal as a set of blocks. Each of the set of blocks includes a two-dimensional array of pixels of the video signal. For example, electronic circuitry, as realized by the layering codec 250 (FIG. 2) in the computerized apparatus 110, or in one or more chips, modules, specialized processors, and so on, is operated to express a portion of a video signal (e.g., portion 410; FIG. 4) as a set of blocks (e.g., blocks 420). Each of the blocks 420 includes a two-dimensional array of pixels 430 of the video signal.

At 1312, multiple acts are performed for each current block of the set of blocks (e.g., blocks 420). The multiple acts may be performed for different blocks sequentially, simultaneously (e.g., using parallel processing), or in any suitable order.

At 1312a, multiple layers are generated. Each layer includes a two-dimensional array of pixels and provides a rendition of the current block. For example, as shown in FIG. 5, the layer generator 510 generates multiple layers (L1 and L2), where each layer represents a rendition of the current block 420. In some examples, each rendition is a respective prediction of the current block (e.g., using intra-frame and/or inter-frame prediction; see FIGS. 8A, 8B, 9A, and 9B). In other examples, the encoder 310 provides the current block 420 itself as the respective layers (e.g., L1 and L2), such that the rendition of each layer is the same as the current block 420 itself. The layer generator 510 generates respective masks (e.g., M1 and M2) to distinguish between content of respective layers, such as by using edge detection and/or color detection (see FIGS. 10A, 10B, 11A, and 11B).

At 1312b, for each layer generated for the current block, an associated mask is generated that identifies (a) one set of pixels that are to be used in reconstructing the current block and (b) another set of pixels that are not to be used in reconstructing the current block. For example, the layer generator 510 generates masks M1 and M2, where each mask identifies a respective set of pixel locations to be used by the decoder 312 (or 312a) when reconstructing the current block 420. Example masks are also shown at FIGS. 8A, 9A, 10A, and 11A.

At 1312c, each of the layers is compressed using a lossy compression procedure. For example, each layer is compressed by computing a residual block (R1 or R2), performing a masked DCT (using operator 530), quantizing resulting DCT coefficients (by quantizer 540), and performing lossless compression on the results (by entropy encoder 550). The quantizer 540 applies rounding and/or truncation to DCT coefficients (e.g., C1 and C2), and thereby introduces losses while reducing the amount of compressed data to be transmitted or stored.

At 1314, the compressed layers and a set of the masks for each of the set of blocks are provided to a video decoder for reconstructing the portion of the video signal. For example, as described in connection with FIG. 5, the compressed residual blocks (e.g., R1 and R2), the prediction modes of the predictions (e.g., P1 and P2) used to generate the residual blocks, and one fewer mask than there are layers are provided to a decoder. The decoder may be a remote decoder 312, e.g., running on a different computerized apparatus or device, or it may be a local decoder 312a used in connection with the encoder 310.

FIG. 14 shows an example decoding process. At 1410, electronic decoding circuitry receives a set of video data representing a two-dimensional array of pixels of a video signal. The set of video data includes (i) multiple residual layers, each residual layer providing an incomplete, lossily-compressed representation of the two-dimensional array of pixels (ii) multiple sets of prediction information, one for each of the residual layers, and (iii) a set of masks for directing reconstruction of the two-dimensional array of pixels. For example, the decoder 312 or 312a, which may be implemented in any of the ways described above, receives the set of video data from an encoder 310, e.g., in the form of an encoded block 570 (FIG. 5), either directly or indirectly. In some examples, the decoder receives the set of video data from the encoder 310 on another machine over a network connection, e.g., during a web conference. In other examples, the decoder receives the set of video data from a storage medium, which has stored encoded video for later playback. In still other examples, the decoder receives the set of video data from a local encoder 310, e.g., running on the same machine. The set of video data includes multiple residual layers, e.g., in the form of quantized blocks Q1 and Q2, as shown in FIG. 5. The set of video data may also include, for example, the mask M1, a merge mode (MM), and prediction identifying information, P1ID and P2ID. The set of video data may arrive in entropy-encoded form, for the decoder 312, or without entropy encoding, for the decoder 312a.

At 1412, multiple decompressed layers are generated based on the residual layers and on the sets of prediction information for the respective residual layers. For example, and as described in connection with FIGS. 6A and 6B, the decoder performs a scaling operation (if needed) and an IDCT (or other inverse-transform operation) on Q1 and Q2, to provide uncompressed residual blocks, R1' and R2'. The decoder also generates a prediction for each layer, based on prediction information P1ID and P2ID. The decoder then adds each uncompressed residual block to a respective prediction to generate a respective decompressed layer.

At 1414, the decompressed layers are combined, as directed by the set of masks, to generate a complete reconstruction of the two-dimensional array of pixels of the video signal. For example, the layer combiner 610 applies masks M1 and M2 and a merge mode, e.g., "select" or "merge," to generate a decoded block 670.

An improved technique has been described for both encoding and decoding video signals. The encoder lossily compresses a portion of a video signal by generating video data including multiple lossily-compressed residual layers, prediction information for each of the residual layers, and a set of masks. According to further aspects, the decoder receives the video data and applies the prediction information to decompress the layers. The decoder then applies the set of masks to the decompressed layers to reconstruct the portion of the video signal.

Section II: Encoding Partially-Masked Video Signals and Selectively Applying Polynomial Transform to Video Data.

This section presents particular improvements for encoding partially-masked video signals and for selectively applying polynomial transforms to video data. These improvements may be carried out in the environment described in Section I, as part of layer-based video encoding and decoding. However, the improvements in this section are not limited to that environment or to the particular encoding and decoding schemes presented therein.

In accordance with some embodiments, an improved technique receives a two-dimensional pixel array, such as a block or layer of video content, as well as a mask that distinguishes "don't-care" pixels in the pixel array from "care" pixels. The technique encodes the pixel array by taking into consideration the care pixels only, without regard for the don't-care pixels. The resulting encoding of the pixel array predicts values at locations of the don't-care pixels, but those values are allowed to assume any levels that simplify the encoding of the care pixels. An encoder operating in this manner can produce a simplified encoding of the pixel array, which represents the care pixels to any desired level of accuracy, without regard for errors in the don't-care pixels, which are irrelevant to reconstruction.

Figure 15:
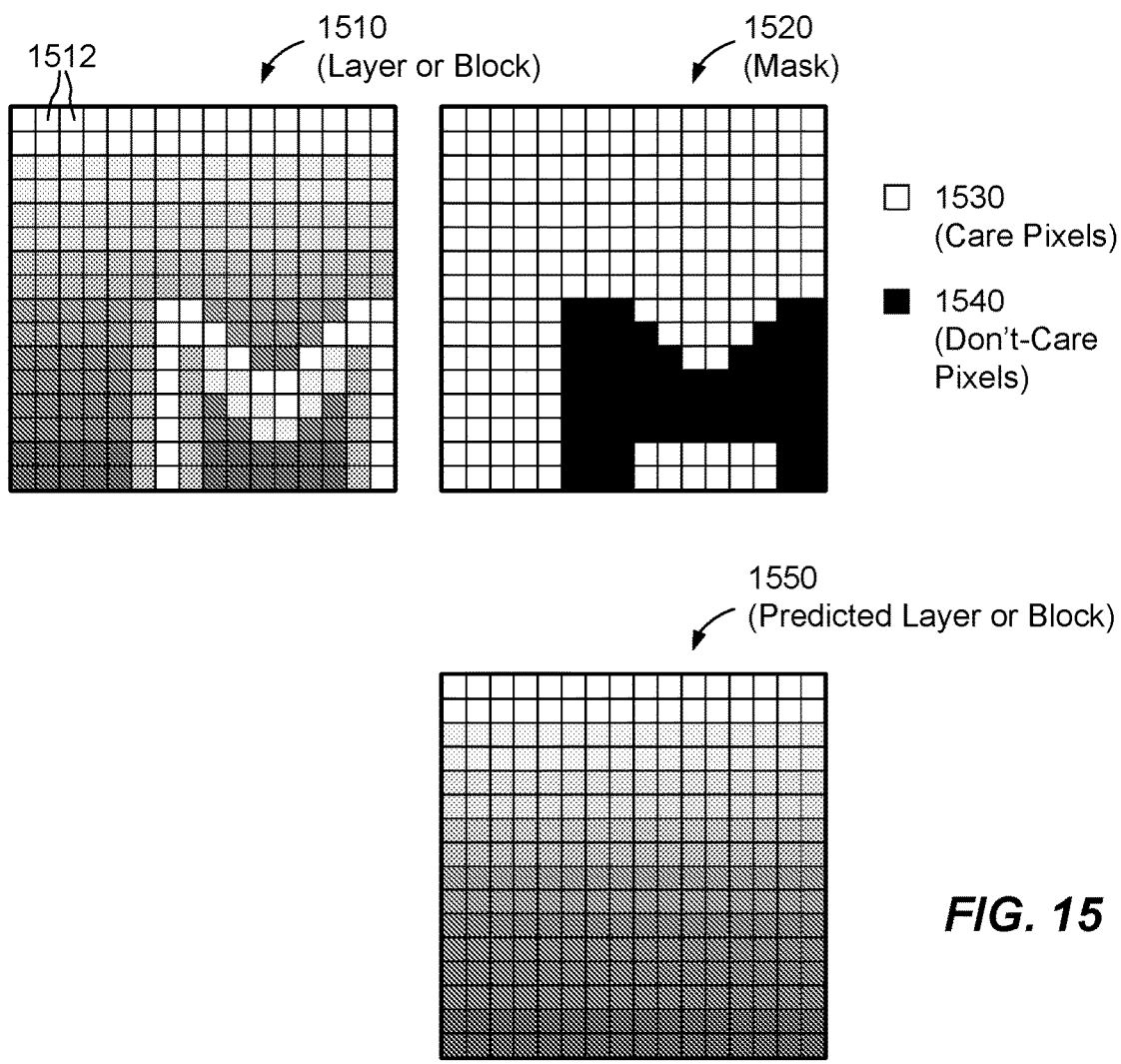
FIG. 15 shows an example pixel array encoded without regard to values of don't-care pixels.

FIG. 15 shows a pixel array 1510, e.g., a block or layer, which includes a two-dimensional array of pixels 1512, such as 256 pixels. The pixel array 1510 includes a gradually-darkening gradient (from top to bottom) and light pixels that depict the letter "M." The pixel array 1510 is provided with a mask 1520, which distinguishes care pixels 1530 of the pixel array 1510 from don't-care pixels 1540 at corresponding locations. The mask 1520 may be provided as a binary mask, where a "1" indicates a care pixel and a "0" indicates a don't-care pixel, or vice-versa.

Ordinarily, the pixel array 1510 would be computationally intensive to encode, as the sharp edges around the letter M introduce high-frequency content that requires generation of a large number of coefficients. However, in accordance with improvements hereof, the mask 1520 identifies the pixels that form the letter M as don't-care pixels. The mask 1520 thus signals to an encoder that the pixels at the masked locations are not to be considered when encoding the pixel array 1510.

A reconstructed array 1550 shows a result of encoding and then decoding the pixel array 1510, where the encoding uses only the care pixels 1530 without regard for the don't-care pixels 1540. In the reconstructed array 1550, the letter M has disappeared and the original pixels at the don't-care locations have been filled in with reconstructed pixels that maintain continuity with the background gradient. One should appreciate that the letter M may be reconstructed as part of a different layer or using some other means, e.g., one tailored for text. Also, one should appreciate that the process for generating the reconstructed array 1550 may be used intentionally for text removal or for removal of other distinct features besides text. Thus, to remove features such as text and the like, one needs only to specify such features as don't-care pixels and then encode the resulting array using only the care pixels. A resulting reconstruction from the encoded content fills in the don't-care locations with content that is continuous with the background.

The amount of computation required to produce an encoding that ignores the letter M is less than that required to produce an encoding that includes the letter M. In addition, an encoding that ignores the letter M requires less data to describe and thus less bandwidth to transmit.

Various techniques may be used to generate encodings of the pixel array 1510 that ignore don't-care pixels 1540. One example is to use the masked DCT 530 or other frequency transform, as described in connection with FIGS. 5 and 12A-12D of Section I above. Another example is to avoid transformation to the frequency domain and instead to perform encoding in the spatial domain.

Indeed, we have recognized that certain image features can be described very efficiently in the spatial domain, even though they require large amounts of data to represent accurately in the frequency domain. Consider, for example, a linearly-changing gradient, such as the one shown in the background of pixel array 1510. The gradient might require a large number of frequency components to represent accurately in the frequency domain, but the same gradient can be expressed very simply in the spatial domain, e.g., as a ramp.

To this end, an improved encoder represents video data using multi-dimensional polynomials in the spatial domain. For example, the encoder employs a polynomial transform (PTM) to generate an estimate of a pixel array as a discrete surface defined by multiple polynomial coefficients. The surface may represent varying levels of a particular color (e.g., red, green, or blue), of luminance, of chrominance, or of any other video characteristic exhibited by the pixel array. No effort is made to transform the pixel array to a different domain; rather, the pixel array is estimated as a polynomial-defined surface in the spatial domain. For example, the surface may have one or more constant components, linear components, quadratic components, cubic components, and so forth. In some examples, the encoder generates a matrix of polynomial coefficients for each pixel array. A decoder receives each matrix and reconstructs the respective pixel array by expressing the polynomial content as spatially varying levels of the encoded parameter (color, luminance, etc.), which vary in the manner specified by the polynomial content in the respective matrix.

Figure 16:
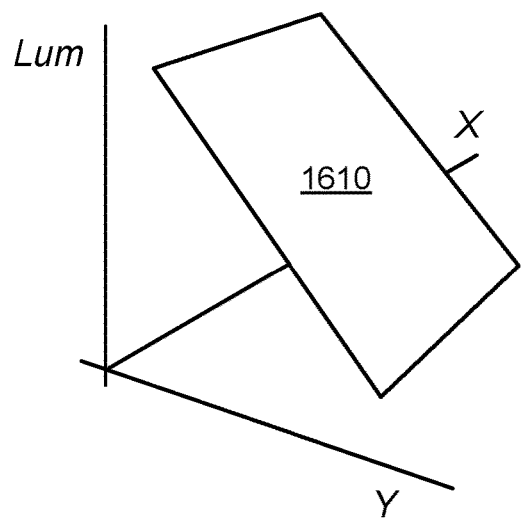
FIG. 16 shows an example polynomial surface that may be generated from the pixel array of FIG. 15 using a polynomial transform.

FIG. 16 shows an example polynomial surface 1610 generated by a polynomial type of encoder. In this example, the polynomial surface 1610 represents the luminance of pixels shown in pixel array 1550 (FIG. 15). Here, the polynomial surface 1610 is depicted as a ramp, which an encoder may represent using only one or two parameters.

In some examples, the encoder estimates the polynomial content of each pixel array by applying a least-squares approximation (or other optimization) to arrive at a surface that describes the spatial pixel data of the current block. According to some variants, the least-squares (or other optimization) works not only on the two spatial dimensions of the pixel array (e.g., X and Y), but also on a third dimension of time, such that a best-fit optimization produces polynomial coefficients that optimize over both space and time (e.g., to corresponding locations in one or more adjacent frames). According to some variants, the encoder expresses the best-fit surface as a matrix of polynomial coefficients and performs compression activities by rounding and/or truncating the generated coefficients.

In some examples, the encoder performs additional compression by reducing a size of the matrix such that certain coefficients are removed. According to some variants, the coefficients that are removed are coefficients of higher-order polynomial components, such that the polynomial-defined surface includes only lower-order polynomial components. However, any coefficients may be removed. According to some variants, the least-squares approximation (or other optimization) has a priori knowledge of the coefficients that will be retained in the matrix and those that will be removed, and performs its best-fit optimization by adjusting only those coefficients that will be retained, excluding from its optimization those coefficients that will be removed. The optimization thus produces a best-fit surface given only the coefficients that will be retained. According to some variants, an encoder is configured to generate no greater than "N" polynomial parameters, one parameter for a maximum order of N. The encoder may then attempt to achieve a best fit for an $N^{th}$-order polynomial.

In some examples, the encoder employs Regularization. Regularization is a known technique, commonly used in machine learning, to prevent a least-squares approximation from overfitting to available data. Regularization may be used herein to simplify best-fit solutions. Although the term "best fit" is used herein, one should appreciate that any best-fit approximation is not necessarily the "best" in any absolute sense, but is merely the most optimal solution given the operating constraints.

When used on pixel arrays having both care pixels and don't-care pixels, the encoder may generate a matrix of polynomial coefficients using only the "care" pixels, such that the don't-care pixels contribute nothing to the matrix of polynomial coefficients. It is not that the encoder estimates the don't-care pixels as zeros. Rather, the encoder generates the best-fit polynomial coefficients to the care pixels and does not apply the don't-care pixels when generating the best-fit surface. No special arrangement is needed to exclude the don't-care pixels; rather, they may simply be excluded from the data set upon which the PTM is performed, such that the PTM fits the polynomial surface to the care pixels only. This arrangement is analogous to simply removing an undesired data point when performing curve fitting. The resulting curve ignores the removed data point and generates its best fit based on the remaining data points.

In some examples, the encoder employs a form of residual-block encoding, in which the encoder identifies a previously-processed reference block based on its polynomial coefficients closely matching those of a current block (e.g., by searching a reference buffer for a closest match). The encoder may then generate a residual matrix as a coefficient-wise difference between the matrix for the current block and a matrix for the reference block. The coefficients of the residual matrix are typically much smaller than those for the current block, promoting higher degrees of compression. In this arrangement, the encoder transmits metadata to the decoder that identifies the reference block, enabling the decoder to add back the coefficients of the reference block to those of the recovered residual block when regenerating the current block.

Figure 17:
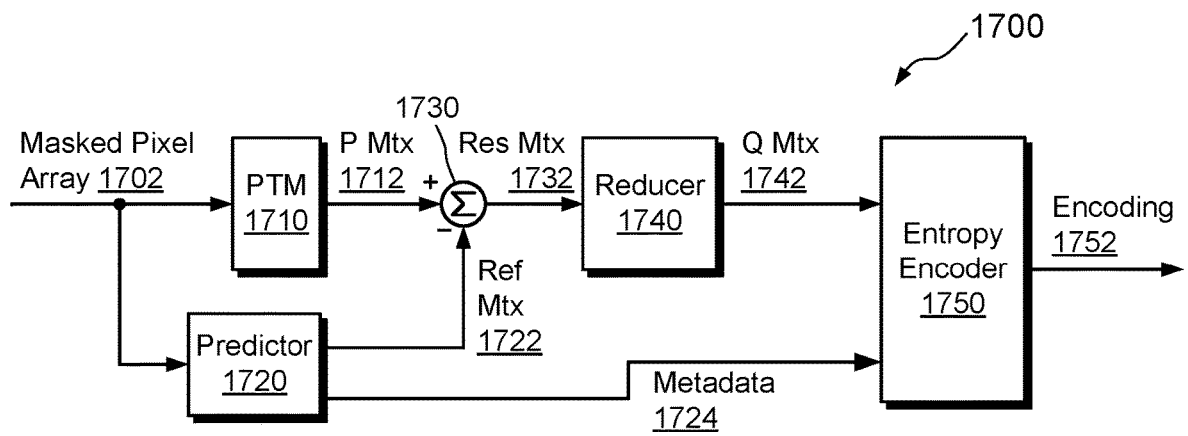
FIG. 17 shows an example encoder that operates using a polynomial transform.

FIG. 17 shows an example polynomial encoder 1700 that uses residual block encoding. Here, a PTM unit 1710 generates a matrix 1712 of polynomial transform coefficients for a masked pixel array 1702, i.e., one for which a mask 1520 has already been applied. For example, the masked pixel array 1702 provides values only at care locations and provides no values at don't-care locations. A predictor 1720 receives the masked pixel array 1702 and generates therefrom a prediction, in the form of reference matrix 1722, which represents a polynomial matrix generated previously and stored in a reference buffer (not shown) accessible by the encoder 1700. Summer 1730 generates a residual matrix 1732, which provides a polynomial matrix of residual values. One should appreciate that subtraction of the reference matrix 1722 from the polynomial matrix 1712 may be performed coefficient-wise, i.e., where each coefficient of the reference matrix 1722 is subtracted from the corresponding coefficient (at the same location) of the polynomial matrix 1712 to produce a corresponding coefficient for the residual matrix 1732. The reducer 1740 reduces the magnitudes and/or number of polynomial coefficients in the residual matrix 1732 to produce a quantized matrix 1742. The reducer 1740 may employ rounding, truncating, and/or regularization for this purpose. Entropy encoder 1750 losslessly compresses the quantized matrix 1742 to produce an encoding 1752. The encoding 1752 may include metadata 1724, which identifies the reference matrix 1722, so that a decoder can access the same reference block when reconstructing the pixel array 1702.

Figure 18:
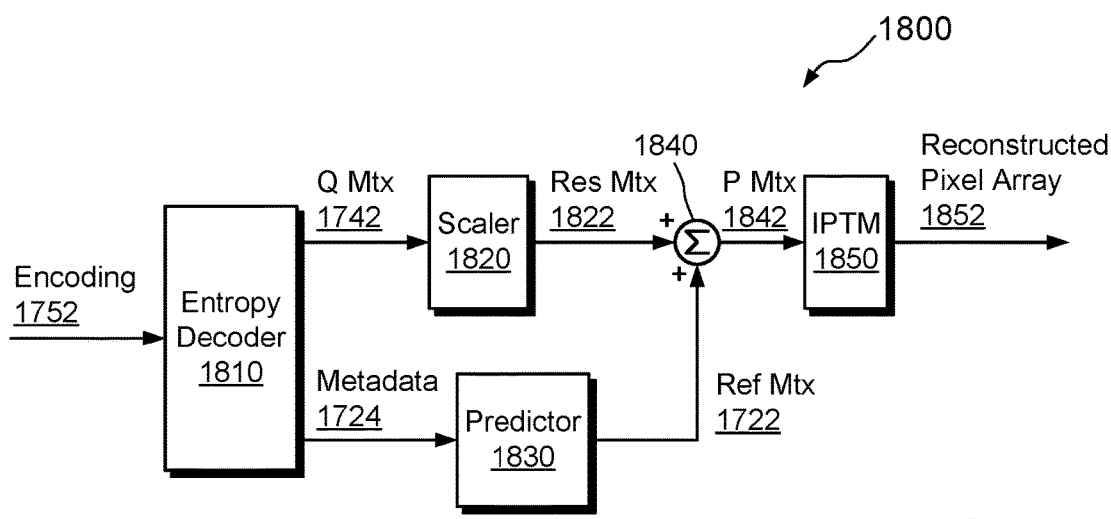
FIG. 18 shows an example decoder that operates using an inverse polynomial transform.

FIG. 18 shows an example polynomial decoder 1800, which may be used to decode an encoding 1752 produced by the encoder 1700. Here, entropy decoder 1810 performs lossless decompression of the encoding 1752 to recover the quantized matrix 1742 and metadata 1724. A scaler 1820 descales any scaling applied by the reducer 1740, thereby recovering a version 1822 of the residual matrix. Also, a predictor 1830 accesses reference matrix 1722, by applying metadata 1624, and a summer 1840 adds the reference matrix 1722 to the residual matrix 1822, thereby recovering a version 1842 of the polynomial matrix. Inverse-PTM 1850 then takes the terms in polynomial matrix 1842 and establishes pixel values of the reconstructed pixel array 1852 at each pixel location.

Although FIGS. 17 and 18 depict examples in which residual encoding may be used, a similar encoder may be used without residual encoding, e.g., by eliminating predictor 1720. Likewise, a similar decoder may be used without residual decoding, e.g., by eliminating predictor 1830.

Figure 19:
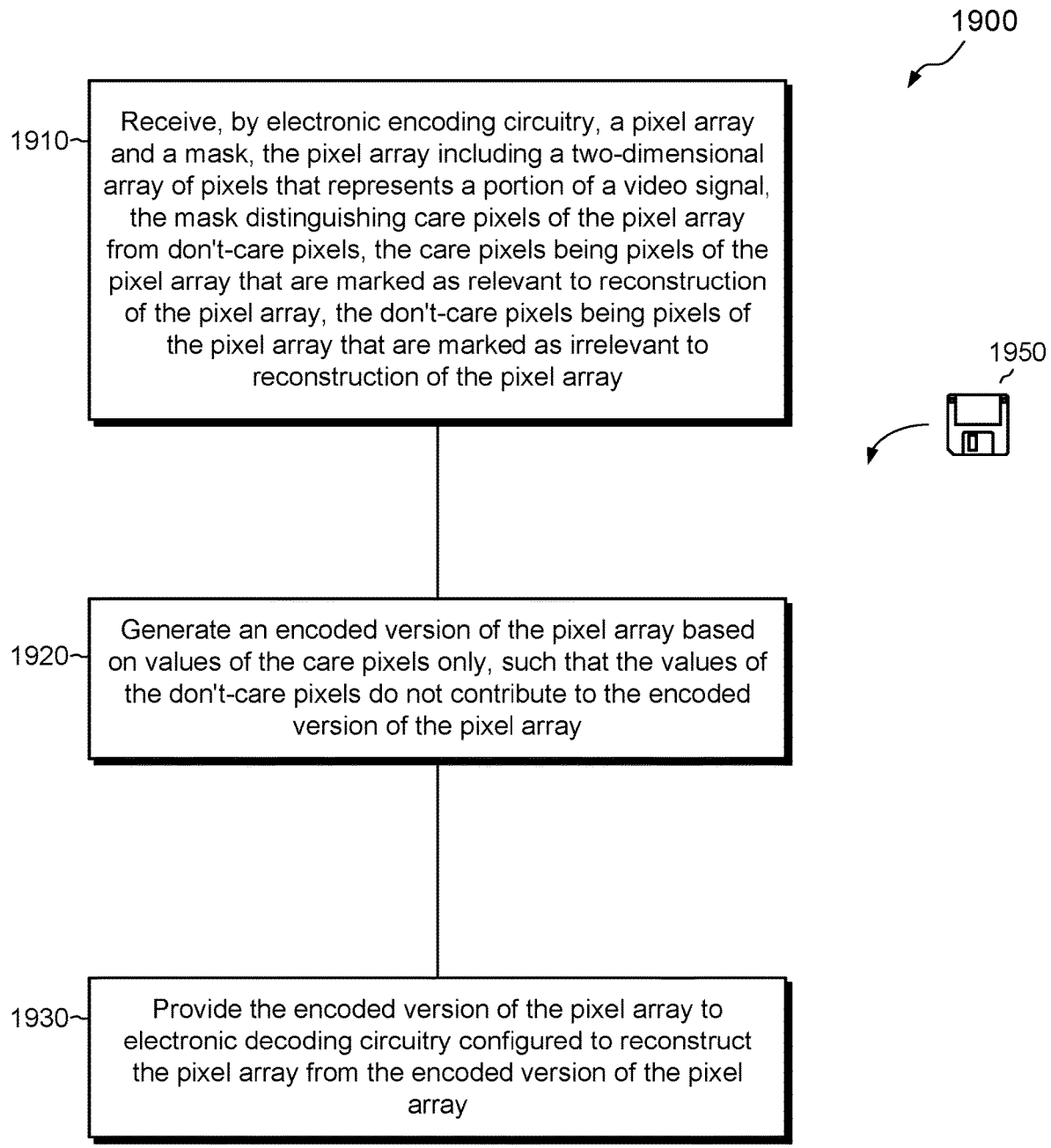
FIG. 19 is a flowchart showing one example method of encoding video signals.

FIG. 19 shows an example method 1900 for encoding video signals. The method 1900 may be carried out, for example, by electronic encoding circuitry that realizes the encoder 1700, or that realizes some other encoder that performs polynomial transforms.

At 1910, the electronic encoding circuitry receives a pixel array 1510 and a mask 1520. The pixel array includes a two-dimensional array of pixels 1512 that represents a portion of a video signal. The mask 1520 distinguishes care pixels 1530 of the pixel array 1510 from don't-care pixels 1540. The care pixels 1530 are pixels 1512 of the pixel array 1510 that are marked as relevant to reconstruction of the pixel array, and the don't-care pixels 1540 are pixels 1512 of the pixel array 1510 that are marked as irrelevant to reconstruction of the pixel array.

At 1920, an encoded version 1752 of the pixel array 1510 is generated based on values of the care pixels 1530 only, such that the values of the don't-care pixels 1540 do not contribute to the encoded version 1752 of the pixel array 1510.

At 1930, the encoded version 1752 of the pixel array 1510 is provided to electronic decoding circuitry 1800 configured to reconstruct the pixel array 1510 from the encoded version 1752 of the pixel array 1510.

An improved technique has been described that receives a two-dimensional pixel array 1510, such as a block or layer of video content, as well as a mask 1520 that distinguishes "don't-care" pixels 1540 in the pixel array 1510 from "care" pixels 1530. The technique encodes the pixel array 1510 by taking into consideration the care pixels 1530 only, without regard for the don't-care pixels 1540. The resulting encoding 1572 of the pixel array 1510 predicts values at locations of the don't-care pixels 1540, but such values are allowed to assume any levels that simplify the encoding of the care pixels 1530. An encoder 1700 operating in this manner can produce a simplified encoding of the pixel array 1510, which represents the care pixels 1530 to any desired level of accuracy, without regard for errors in the don't-care pixels 1540, which are irrelevant to reconstruction.

Having described certain embodiments, numerous alternative embodiments or variations can be made. For example, although embodiments have been described in which polynomial transforms 1710 are used for processing pixel arrays 1510 in the context of layer-based video encoding, the use of polynomial transforms is not limited to this context. In accordance with additional embodiments, a polynomial transform (PTM) is selectively applied in place of a frequency transform (FTM), such as a DCT or the like, for encoding video content that meets a specified set of criteria. Contents meeting the criteria are encoded using the PTM, and contents not meeting the criteria are encoded using a frequency transform. The PTM operates in the spatial domain, as described above, by generating a polynomial surface 1610 that represents pixels of video content, such as a block or layer. An encoder 1700 renders the polynomial surface 1610 as a set of parameters and supplies the parameters in a video stream to a decoder 1800, which reconstructs the video content based on the parameters.

Various criteria may be used for selectively applying the PTM, such as image complexity, the presence of text or other high-contrast content over a background, the presence of gradients, and/or based on whether the content is natural or synthetic. As the PTM operates more efficiently on selected content than would an FTM, selective use of the PTM improves computational efficiency of encoders. It also produces smaller data sets, which translates to lower bandwidth requirements.

Figure 20:
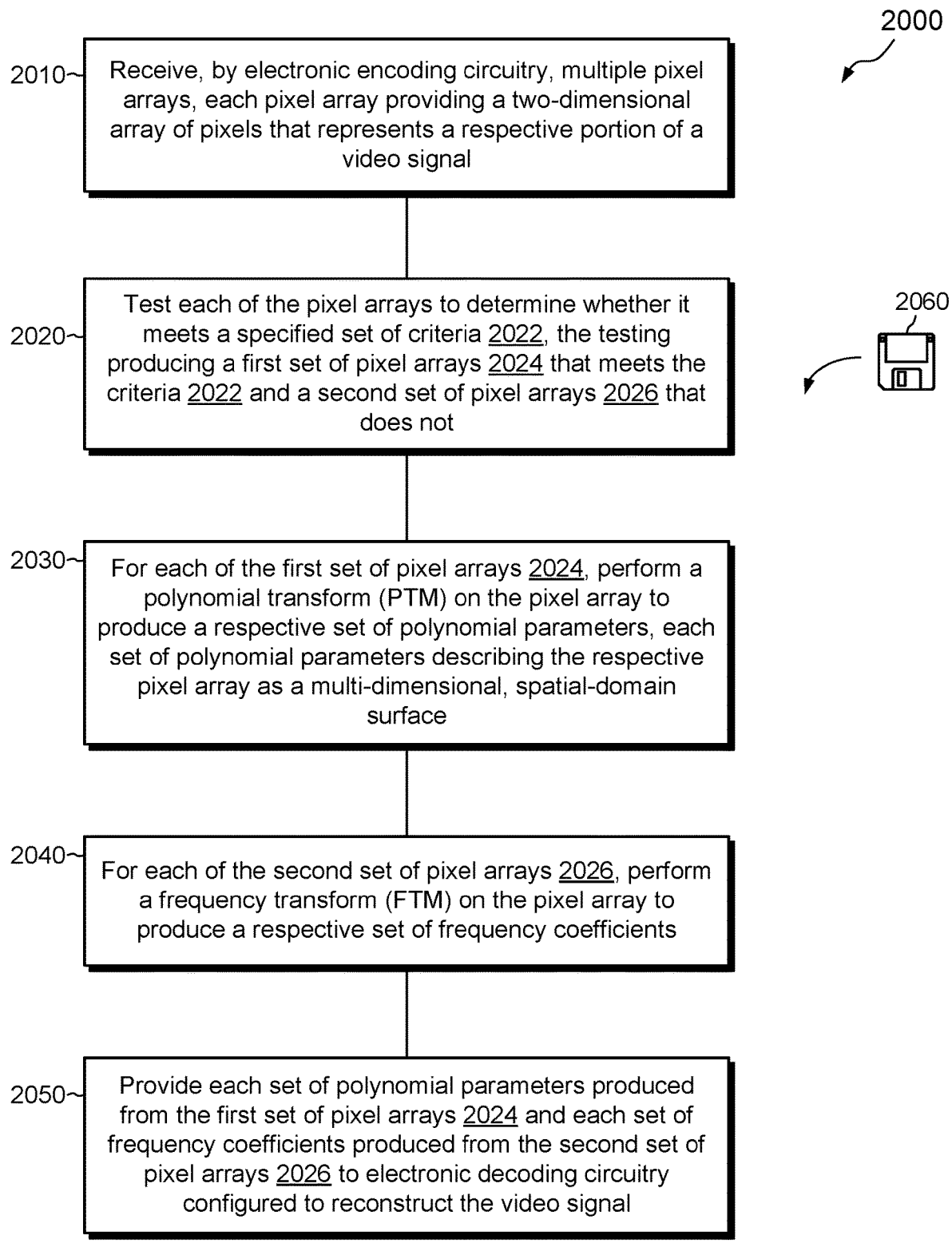
FIG. 20 is a flowchart showing another example method of encoding video signals.

FIG. 20 shows an example method 2000 of encoding video signals. The method 2000 may be carried out, for example, by electronic encoding circuitry that realizes the encoder 1700, or that realizes some other encoder that performs polynomial transforms.

At 2010, the electronic encoding circuitry receives multiple pixel arrays 1510. Each pixel array 1510 provides a two-dimensional array of pixels 1512 that represents a respective portion of a video signal.

At 2020, each of the pixel arrays 1510 is tested to determine whether it meets a specified set of criteria 2022. The testing produces a first set of pixel arrays 2024 that meets the criteria 2022 and a second set of pixel arrays 2026 that does not.

At 2030, for each of the first set of pixel arrays 2024, a polynomial transform (PTM) is performed on the pixel array to produce a respective set of polynomial parameters. Each set of polynomial parameters describes the respective pixel array as a multi-dimensional, spatial-domain surface 1610.

At 2040, for each of the second set of pixel arrays 2026, a frequency transform (FTM) is performed on the pixel array to produce a respective set of frequency coefficients.

At 2050, each set of polynomial parameters produced from the first set of pixel arrays 2024 and each set of frequency coefficients produced from the second set of pixel arrays 2026 is provided to electronic decoding circuitry 1800 configured to reconstruct the video signal.

Although embodiments have been described in the context of a web conferencing application that supports screen sharing, encoders and/or decoders as described herein may be used in connection with a wide range of software applications or independently of any software application. Other example use cases may include multicasting, webcasting, and/or broadcasting, for example.

Further still, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 1350, 1450, 1950, and 2060 in FIGS. 13, 14, 19, and 20). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

Additional Information:

The following describes a proposed polynomial transform in greater detail. The input values for the proposed polynomial transform (PTM) are image pixel data of an n×n block with each pixel being represented as $f(x_0,x_1)$ at block position $(x_0,x_1)$: $x_0,x_1 \in \{0, \ldots, n-1\}$.

The output of the transformed data is represented as coefficients in an $n^2 \times 1$ matrix A.

The output of the inverse transformed coefficients from A is represented as the reconstructed image $f'(x_0,x_1)$ with $(x_0,x_1)$: $x_0,x_1 \in \{0, \ldots, n-1\}$ of a n×n block.

As an example, the inverse polynomial transform (IPT) $f'(x_0,x_1)$ of an 4×4 block would be:

$$f'(x_0, x_1) = a_{00} + a_{01}x_0 + a_{02}x_0^2 + a_{03}x_0^3 +$$
$$a_{10}x_1 + a_{11}x_0x_1 + a_{12}x_0^2x_1 + a_{13}x_0^3x_1 + a_{20}x_1^2 + a_{21}x_0x_1^2 +$$
$$a_{22}x_0^2x_1^2 + a_{23}x_0^3x_1^2 + a_{30}x_1^3 + a_{31}x_0x_1^3 + a_{32}x_0^2x_1^3 + a_{33}x_0^3x_1^3$$

where $a_{00} \ldots a_{33}$ are the transform coefficients from A. This can also be written as matrix calculus:

$$Y = AX^T$$

$$f'(x_0, x_1) = \{a_{00} \ldots a_{33}\} \cdot \begin{Bmatrix} x_0^0 x_1^0 \\ \vdots \\ x_0^3 x_1^3 \end{Bmatrix},$$

with X being the inverse transform matrix, $X^T$ being the transpose matrix of X, A being the coefficients being encoded in a video or image bit stream, and Y being the final, reconstructed pixel values with elements $f'(x_0,x_1)$.

The following shows positions of coefficients of X and establishes a correspondence between coefficients and pixel positions in the 4×4 block:

| 1 | $x_0$ | $x_0^2$ | $x_0^3$ |
|---|---|---|---|
| $x_1$ | $x_0 x_1$ | $x_0^2 x_1$ | $x_0^3 x_1$ |
| $x_1^2$ | $x_0 x_1^2$ | $x_0^2 x_1^2$ | $x_0^3 x_1^2$ |
| $x_1^3$ | $x_0 x_1^3$ | $x_0^2 x_1^3$ | $x_0^3 x_1^3$ |

To keep the magnitude of resulting transform coefficients low, the center of the transform is moved into the middle of the 4×4 block. The proposed transform uses the following mapping of pixel position to transform coordinate. Note that any scaling of coefficients performed by the encoder to promote higher compression would generally need to be rescaled back to normal by the decoder:

| | x and y positions in 4 × 4 block | | | |
|---|---|---|---|---|
| | 0 | 1 | 2 | 3 |
| Transform coordinate | −3/2 | −1/2 | 1/2 | 3/2 |

The resulting coefficients are stored in a 1D array which sorts the coefficients by relevance. The proposed transform uses the following index scan-order of 2D coefficients into a 1D array:

| Pixel position in 4 × 4 block | 0 | 1 | 2 | 3 |
|---|---|---|---|---|
| 0 | 0 | 1 | 4 | 9 |
| 1 | 2 | 3 | 6 | 11 |
| 2 | 5 | 7 | 8 | 13 |
| 3 | 10 | 12 | 14 | 15 |

Based on the pixel-mapping and scan-order above, we generate the inverse transform matrix X as follows:

$$\left\{\begin{array}{cccccccccccccccc} 1 & -3 & -3 & 9 & 9 & 9 & -27 & -27 & 81 & -27 & -27 & 81 & 81 & -243 & -243 & 729 \\ 1 & -3 & -1 & 3 & 9 & 1 & -9 & -3 & 9 & 27 & -1 & 27 & 3 & -27 & -9 & 27 \\ 1 & -3 & 1 & -3 & 9 & 1 & 9 & -3 & 9 & -27 & 1 & -27 & -3 & -27 & 9 & -27 \\ 1 & -3 & 3 & -9 & 9 & 9 & 27 & -27 & 81 & -27 & 27 & -81 & -81 & -243 & 243 & -729 \\ 1 & -1 & -3 & 3 & 1 & 9 & -3 & -9 & 9 & -1 & -27 & 3 & 27 & -9 & -27 & 27 \\ 1 & -1 & -1 & 1 & 1 & 1 & -1 & -1 & 1 & -1 & -1 & 1 & 1 & -1 & -1 & 1 \\ 1 & -1 & 1 & -1 & 1 & 1 & 1 & -1 & 1 & -1 & 1 & -1 & -1 & -1 & 1 & -1 \\ 1 & -1 & 3 & -3 & 1 & 9 & 3 & -9 & 9 & -1 & 27 & -3 & -27 & -9 & 27 & -27 \\ 1 & 1 & -3 & -3 & 1 & 9 & -3 & 9 & 9 & 1 & -27 & -3 & -27 & 9 & -27 & -27 \\ 1 & 1 & -1 & -1 & 1 & 1 & -1 & 1 & 1 & 1 & -1 & -1 & -1 & 1 & -1 & -1 \\ 1 & 1 & 1 & 1 & 1 & 1 & 1 & 1 & 1 & 1 & 1 & 1 & 1 & 1 & 1 & 1 \\ 1 & 1 & 3 & 3 & 1 & 9 & 3 & 9 & 9 & 1 & 27 & 3 & 27 & 9 & 27 & 27 \\ 1 & 3 & -3 & -9 & 9 & 9 & -27 & 27 & 81 & 27 & -27 & -81 & -81 & 243 & -243 & -729 \\ 1 & 3 & -1 & -3 & 9 & 1 & -9 & 3 & 9 & 27 & -1 & -27 & -3 & 27 & -9 & -27 \\ 1 & 3 & 1 & 3 & 9 & 1 & 9 & 3 & 9 & 27 & 1 & 27 & 3 & 27 & 9 & 27 \\ 1 & 3 & 3 & 9 & 9 & 9 & 27 & 27 & 81 & 27 & 27 & 81 & 81 & 243 & 243 & 729 \end{array}\right\} \cdot \frac{1}{2^8 * 3^2 * 5^2}$$

Each row of the matrix describes the inverse transform for one particular $f'(x_0, x_1)$.

Example Least Squares Approximation:

The forward transform is created using the Least Squares Approximation. The normal form using Regularization is defined as:

$$A = (X^T X + \lambda \cdot L)^{-1} \cdot X$$

Here, $\lambda$ represents the regularization parameter and L represents the regularization matrix, which is defined as:

$$L = \begin{Bmatrix} 0 & & & \\ & 1 & & \\ & & \ddots & \\ & & & 1 \end{Bmatrix}$$

If $\lambda$ is zero, no regularization is performed. With increasing values of $\lambda$ the magnitude of coefficients in the final transform matrix will decrease but also the distortion of the reconstructed image will increase.

To allow the reduction of the transform to n+1 coefficients, the forward transform is split into two parts:

$$A_n = C_n^{-1} D_n^T$$

$C_n$ is the reduced version of the first part of the normal transform and is defined as follows.

$$C_n = \begin{bmatrix} b_{0,0} & \cdots & b_{0,n} \\ \vdots & \ddots & \vdots \\ b_{n,0} & \cdots & b_{n,n} \end{bmatrix}$$

Where $b_{0,0}, \ldots, b_{15,15}$ is defined as:

$$B = X^T X + \lambda \cdot L$$

$D_n$ is the reduced inverse transform matrix X:

$$D_n = \begin{bmatrix} x_{0,0} & \cdots & x_{0,n} \\ \vdots & \ddots & \vdots \\ x_{15,0} & \cdots & x_{15,n} \end{bmatrix}$$

All remaining forward transform coefficients (16−n) will be forced to zero when applying the coefficients to the inverse transform.

Example Quantization Details:

Prior to transmission of these coefficients, the coefficients may be quantized to reduce the value range of the coefficient values. In an example, the coefficients are reduced in magnitude by dividing them by $2^i$ where i denotes the quantizer being used and subsequently rounded to the nearest integer.

Dequantization is done by multiplying the quantized coefficient by $2^i$ where i denotes the same quantizer used for quantization. The higher i is chosen, the higher the distortion of the reconstructed image will be.

What is claimed is:

1. A method of encoding video signals, the method comprising:
receiving, by electronic encoding circuitry, a pixel array and a mask, the pixel array including a two-dimensional array of pixels that represents a portion of a video signal, the mask distinguishing care pixels of the pixel array from don't-care pixels, the care pixels being pixels of the pixel array that are marked as relevant to reconstruction of the pixel array, the don't-care pixels being pixels of the pixel array that are marked as irrelevant to reconstruction of the pixel array;
generating an encoded version of the pixel array based on values of the care pixels only, including fitting the care pixels, but not the don't-care pixels nor estimates thereof, to a multi-dimensional, spatial-domain surface, such that the values of the don't-care pixels do not contribute to the encoded version of the pixel array; and
providing the encoded version of the pixel array to electronic decoding circuitry configured to reconstruct the pixel array from the encoded version of the pixel array.

2. The method of claim 1, wherein generating the encoded version of the pixel array includes generating results that predict filled-in values at pixel locations of the don't care pixels, the filled-in values based only on the values of the care pixels and not based on the values of the don't-care pixels.

3. The method of claim 2, wherein the don't-care pixels represent text, wherein the care pixels represent a background behind the text, and wherein generating the results that predict the filled-in values includes predicting pixels that appear in place of the text and that are continuous with the background.

4. The method of claim 2,
wherein generating the encoded version of the pixel array further includes defining the multi-dimensional, spatial-domain surface as an $N^{th}$-order polynomial having a respective parameter for each degree of order of the polynomial, and
wherein providing the encoded version of the pixel array to the electronic decoding circuitry includes providing a parameter or a processed version thereof for each degree of order of the polynomial.

5. The method of claim 4, further comprising processing at least one parameter of the polynomial by rounding or truncating the parameter, thereby reducing an amount of data needed to represent the parameter.

6. The method of claim 4, wherein the $N^{th}$-order polynomial is produced as a best-fit approximation of the values of the care pixels in the pixel array.

7. The method of claim 6, wherein producing the $N^{th}$-order polynomial includes applying Least Squares Approximation that employs regularization to avoid overfitting.

8. The method of claim 6, wherein producing the $N^{th}$-order polynomial includes establishing N as a predetermined order of the polynomial, such that the polynomial is limited to having an order no higher than N.

9. The method of claim 1, further comprising:
receiving, by the electronic encoding circuitry, multiple pixel arrays, each pixel array providing a two-dimensional array of pixels that represents a respective portion of a video signal;
testing each of the pixel arrays to determine whether it meets a specified set of criteria, the testing producing a first set of pixel arrays that meets the criteria and a second set of pixel arrays that does not;
for each of the first set of pixel arrays, performing a polynomial transform (PTM) on the pixel array to produce a respective set of polynomial parameters, each set of polynomial parameters describing the respective pixel array as a multi-dimensional, spatial-domain surface;
for each of the second set of pixel arrays, performing a frequency transform (FTM) on the pixel array to produce a respective set of frequency coefficients; and
providing each set of polynomial parameters produced from the first set of pixel arrays and each set of frequency coefficients produced from the second set of pixel arrays to the electronic decoding circuitry configured to reconstruct the video signal.

10. The method of claim 9, wherein the specified set of criteria includes a requirement that a pixel array include both a set of masked pixels and a set of unmasked pixels.

11. A computer program product including a set of non-transitory, computer-readable media having instructions which, when executed by electronic encoding circuitry, cause the electronic encoding circuitry to perform a method for encoding video signals, the method comprising:
receiving a pixel array and a mask, the pixel array including a two-dimensional array of pixels that represents a portion of a video signal, the mask distinguishing care pixels of the pixel array from don't-care pixels, the care pixels being pixels of the pixel array that are marked as relevant to reconstruction of the pixel array, the don't-care pixels being pixels of the pixel array that are marked as irrelevant to reconstruction of the pixel array;
generating an encoded version of the pixel array based on values of the care pixels only, including fitting the care pixels, but not the don't-care pixels nor estimates thereof, to a multi-dimensional, spatial-domain surface, such that the values of the don't-care pixels do not contribute to the encoded version of the pixel array; and
providing the encoded version of the pixel array to electronic decoding circuitry configured to reconstruct the pixel array from the encoded version of the pixel array.

12. The computer program product of claim 11, wherein generating the encoded version of the pixel array includes generating results that predict filled-in values at pixel locations of the don't care pixels, the filled-in values based only on the values of the care pixels and not based on the values of the don't-care pixels.

13. The computer program product of claim 12, wherein the don't-care pixels represent text, wherein the care pixels represent a background behind the text, and wherein generating the results that predict the filled-in values includes predicting pixels that appear in place of the text and that are continuous with the background.

14. The computer program product of claim 12,
wherein generating the encoded version of the pixel array further includes defining the multi-dimensional, spatial-domain surface as an $N^{th}$-order polynomial having a respective parameter for each degree of order of the polynomial, and
wherein providing the encoded version of the pixel array to the electronic decoding circuitry includes providing a parameter or a processed version thereof for each degree of order of the polynomial.

15. The computer program product of claim 14, wherein the method further comprises processing at least one parameter of the polynomial by rounding or truncating the parameter, thereby reducing an amount of data needed to represent the parameter.

16. The computer program product of claim 14, wherein the $N^{th}$-order polynomial is produced as a best-fit approximation of the values of the care pixels in the pixel array.

17. The computer program product of claim 16, wherein producing the $N^{th}$-order polynomial includes applying Least Squares Approximation that employs regularization to avoid overfitting.

18. The computer program product of claim 16, wherein producing the $N^{th}$-order polynomial includes establishing N as a predetermined order of the polynomial, such that the polynomial is limited to having an order no higher than N.

19. An apparatus, comprising electronic encoding circuitry constructed and arranged to:
receive a pixel array and a mask, the pixel array including a two-dimensional array of pixels that represents a portion of a video signal, the mask distinguishing care pixels of the pixel array from don't-care pixels, the care pixels being pixels of the pixel array that are marked as relevant to reconstruction of the pixel array, the don't-care pixels being pixels of the pixel array that are marked as irrelevant to reconstruction of the pixel array;
generate an encoded version of the pixel array based on values of the care pixels only, including fitting the care pixels, but not the don't-care pixels nor estimates thereof, to a multi-dimensional, spatial-domain surface, such that the values of the don't-care pixels do not contribute to the encoded version of the pixel array; and providing the encoded version of the pixel array to electronic decoding circuitry configured to reconstruct the pixel array from the encoded version of the pixel array.

20. The apparatus of claim 19, wherein the electronic encoding circuitry constructed and arranged to generate the encoded version of the pixel array is further constructed and arranged to define the multi-dimensional, spatial-domain surface as an $N^{th}$-order polynomial having a respective parameter for each degree of order of the polynomial, and wherein the electronic encoding circuitry constructed and arranged to provide the encoded version of the pixel array to the electronic decoding circuitry is further constructed and arranged to provide a parameter or a processed version thereof for each degree of order of the polynomial.

\* \* \* \* \*